(12) United States Patent
Johnson

(10) Patent No.: US 6,477,510 B1
(45) Date of Patent: Nov. 5, 2002

(54) EURO BOOKING CURRENCY CONVERSION METHOD

(75) Inventor: Andrew P. Johnson, Union City, NJ (US)

(73) Assignee: Andrew Johnson, Inc., Flanders, NJ (US)

(*) Notice: Subject to any disclaimer, the term of this patent is extended or adjusted under 35 U.S.C. 154(b) by 0 days.

(21) Appl. No.: 09/268,592

(22) Filed: Mar. 15, 1999

(51) Int. Cl.⁷ .............................................. G06F 17/30

(52) U.S. Cl. ......................................... 705/30; 705/1

(58) Field of Search ............................ 705/30, 35, 33, 705/1, 400

(56) References Cited

U.S. PATENT DOCUMENTS 5,897,621 A * 4/1999 Boesch et al. ................. 705/26
5,960,418 A * 9/1999 Kelly et al. ................... 705/408
6,199,046 B1 * 3/2001 Heinzle et al. ............... 705/400

FOREIGN PATENT DOCUMENTS

WO 99/50776 * 10/1999

OTHER PUBLICATIONS

Exchequer Software Ltd. brochure "Changing your Base Currency to the Euro", Mar. 1999.*
SAP Euroline newsletter (No. 1), Oct. 1998.*
*Business Wire* article "QSP Product Line Ensures Businesses Achieve Highest Level of Euro Compiance as Economic and Monetary Union Conversion Looms", Dec. 1998.*
*San Jose Mercury News* article "European Union a Lift for Software", Mar. 1998.*

* cited by examiner

Primary Examiner—Dean J. Kramer
(74) Attorney, Agent, or Firm—Anthony L. Meola

(57) ABSTRACT

This invention relates generally to multi-currency production ledgers, and more particularly to methods of converting multi-currency production ledgers to accommodate the unification of several national currencies by respective participating states into a single currency. In particular the invention relates to a method for use with a computer for converting an ongoing old corp production ledger processing with a participating currency, to an ongoing production ledger processing with a target currency, the old corp production ledger comprising an old master file including a plurality of old master file records, each old master file record comprising a key identifying the record, data fields and amount fields, wherein the conversion is accomplished by selecting a target currency, selecting a particular time period, creating a target currency master file that is substantially identical to the old currency master file, by creating a target currency corp record corresponding to each old currency master file corp record within the old currency master file except that the target currency corp records within the target master file hold zero balances and all participating transaction currency records and their book one equivalents within one old master file key are replaced by a single target transaction record and its book one equivalent, converting the amounts of all transaction currency records and their book one equivalents for the selected time period into their corresponding target currency equivalent amounts, rounding the target currency equivalent amounts, and populating the target currency corp records within the target master file with the corresponding rounded target currency equivalent amounts.

26 Claims, 23 Drawing Sheets

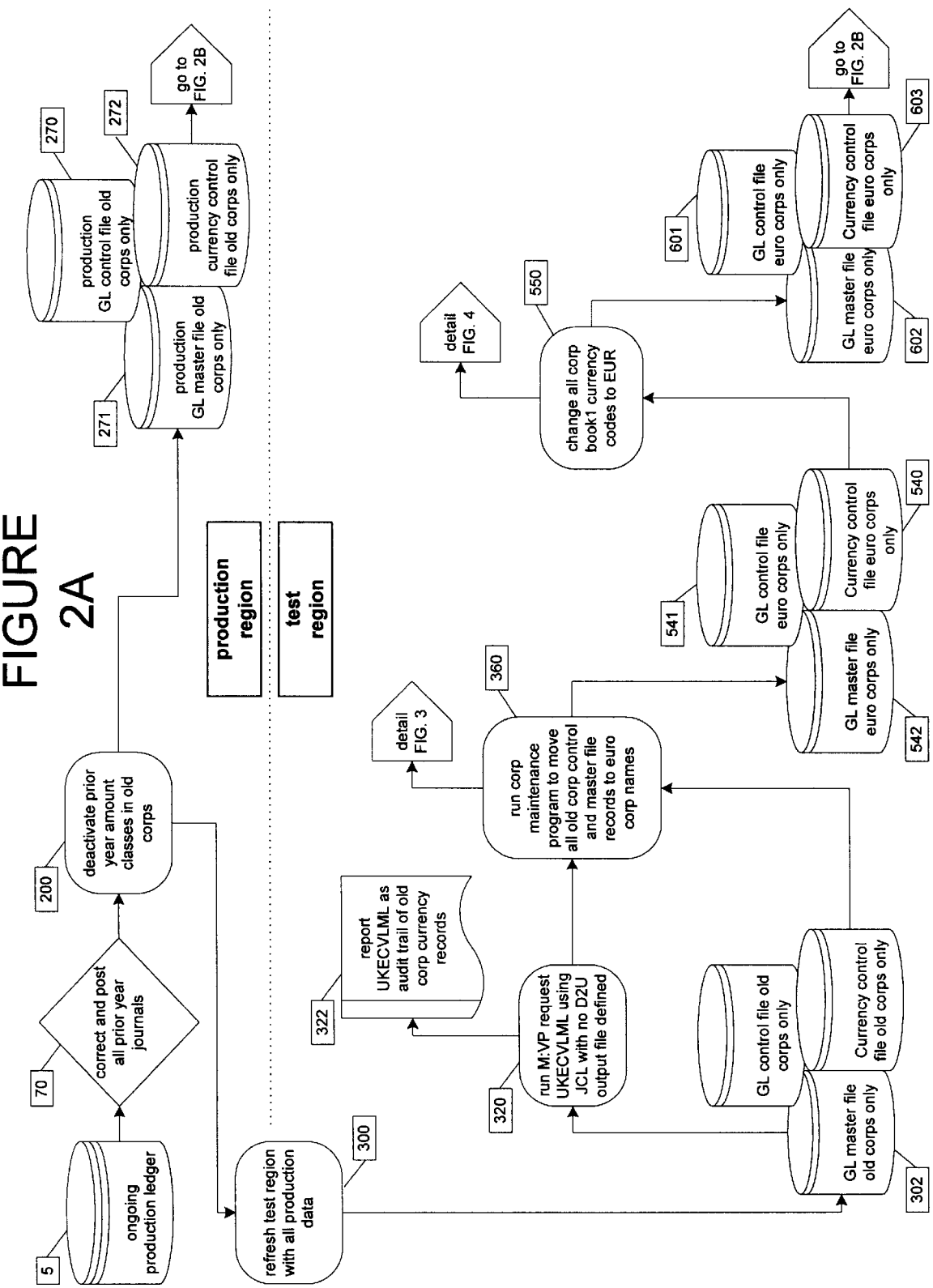

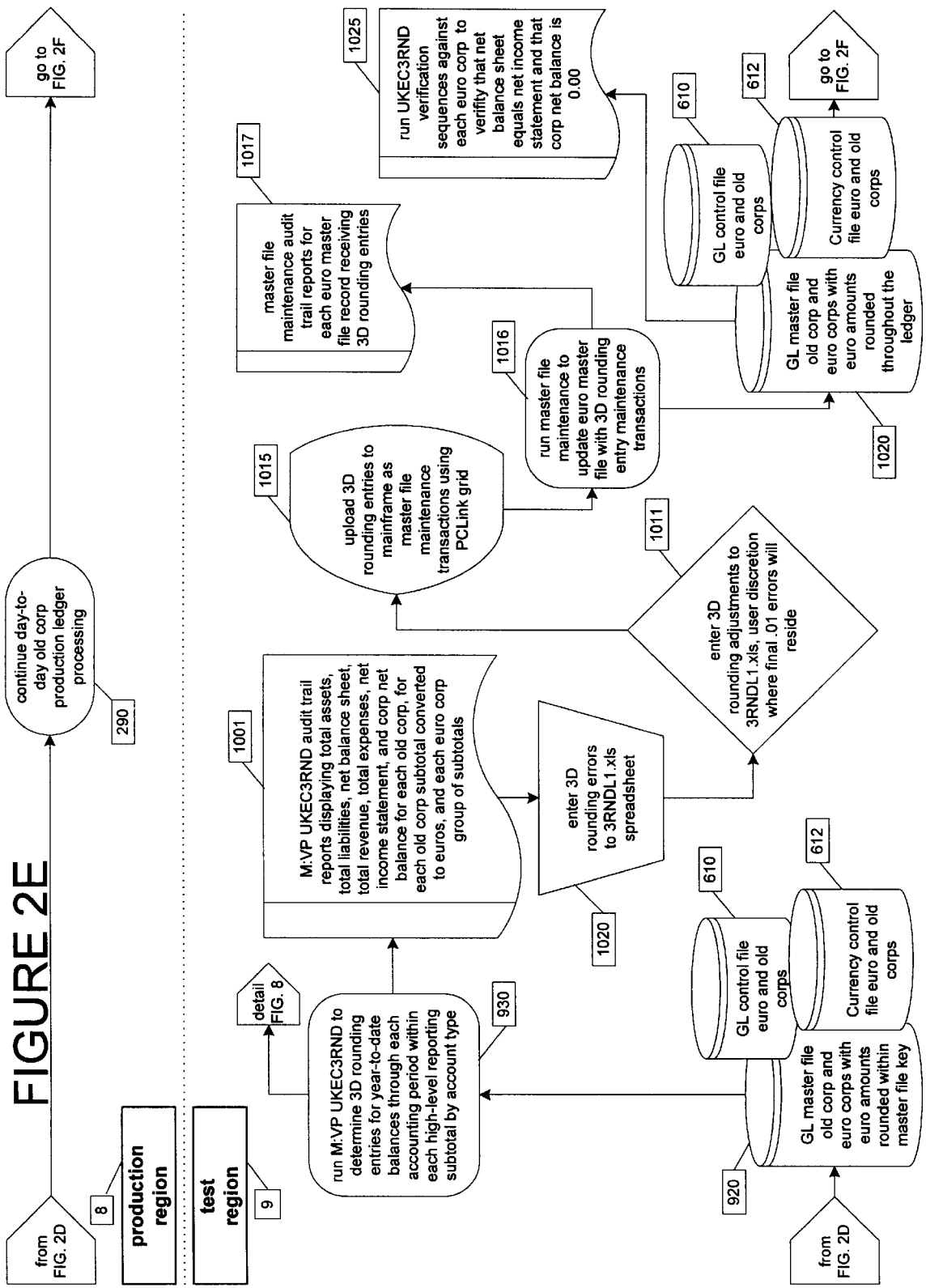

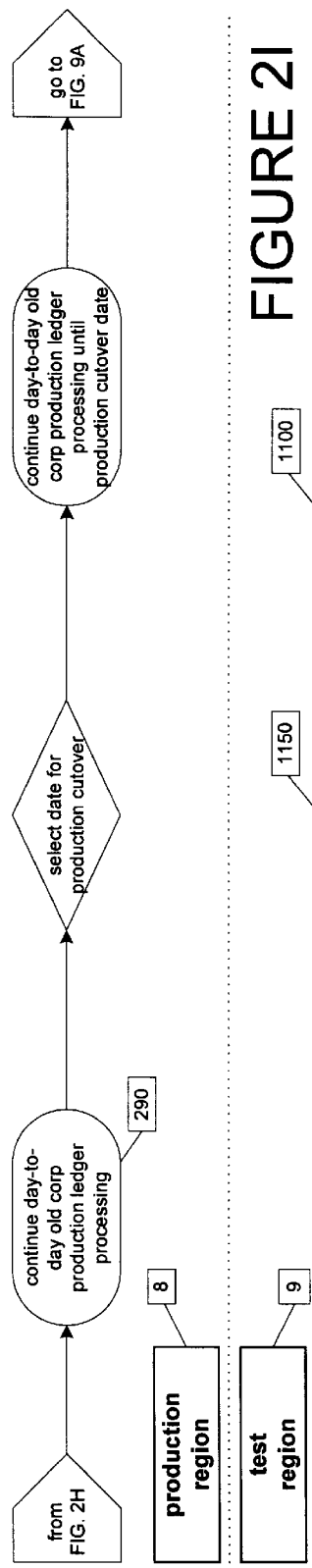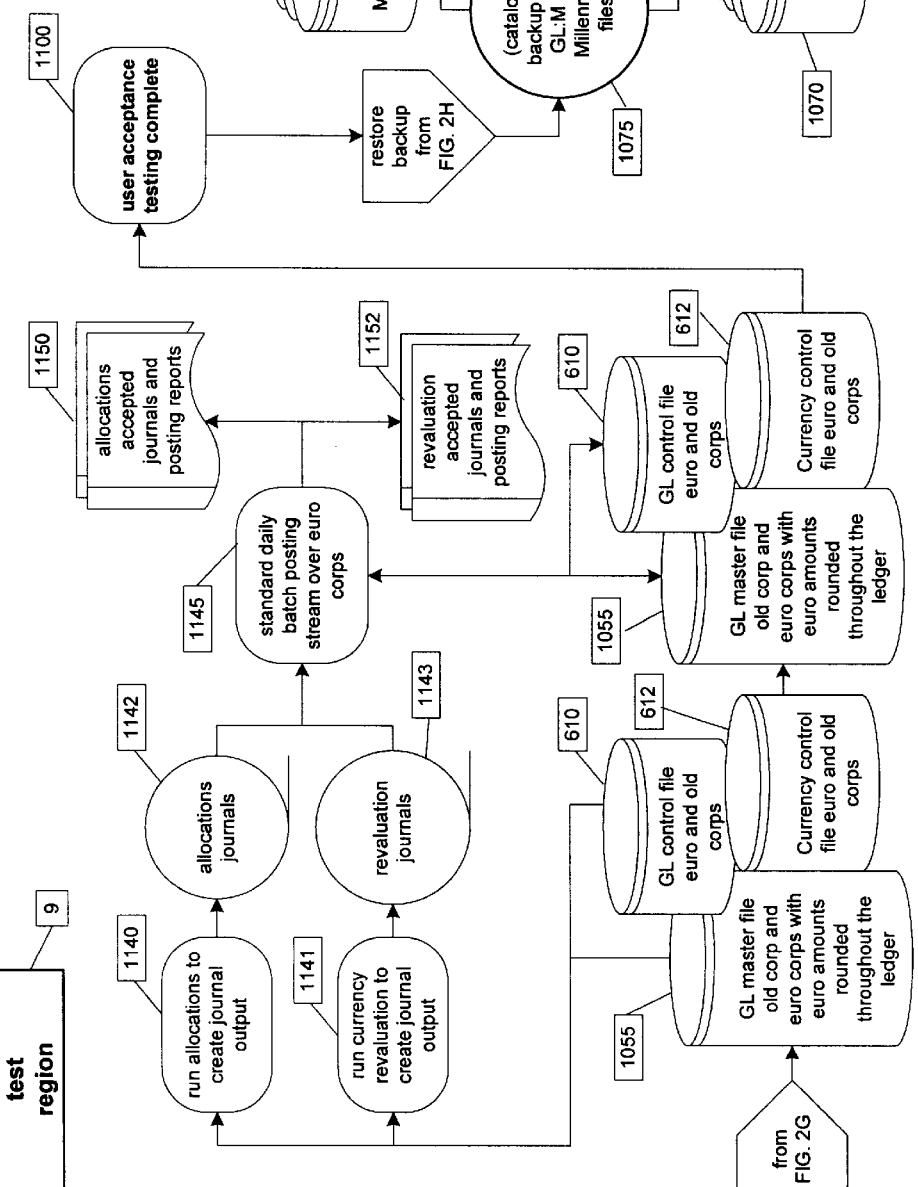
FIGURE 2I

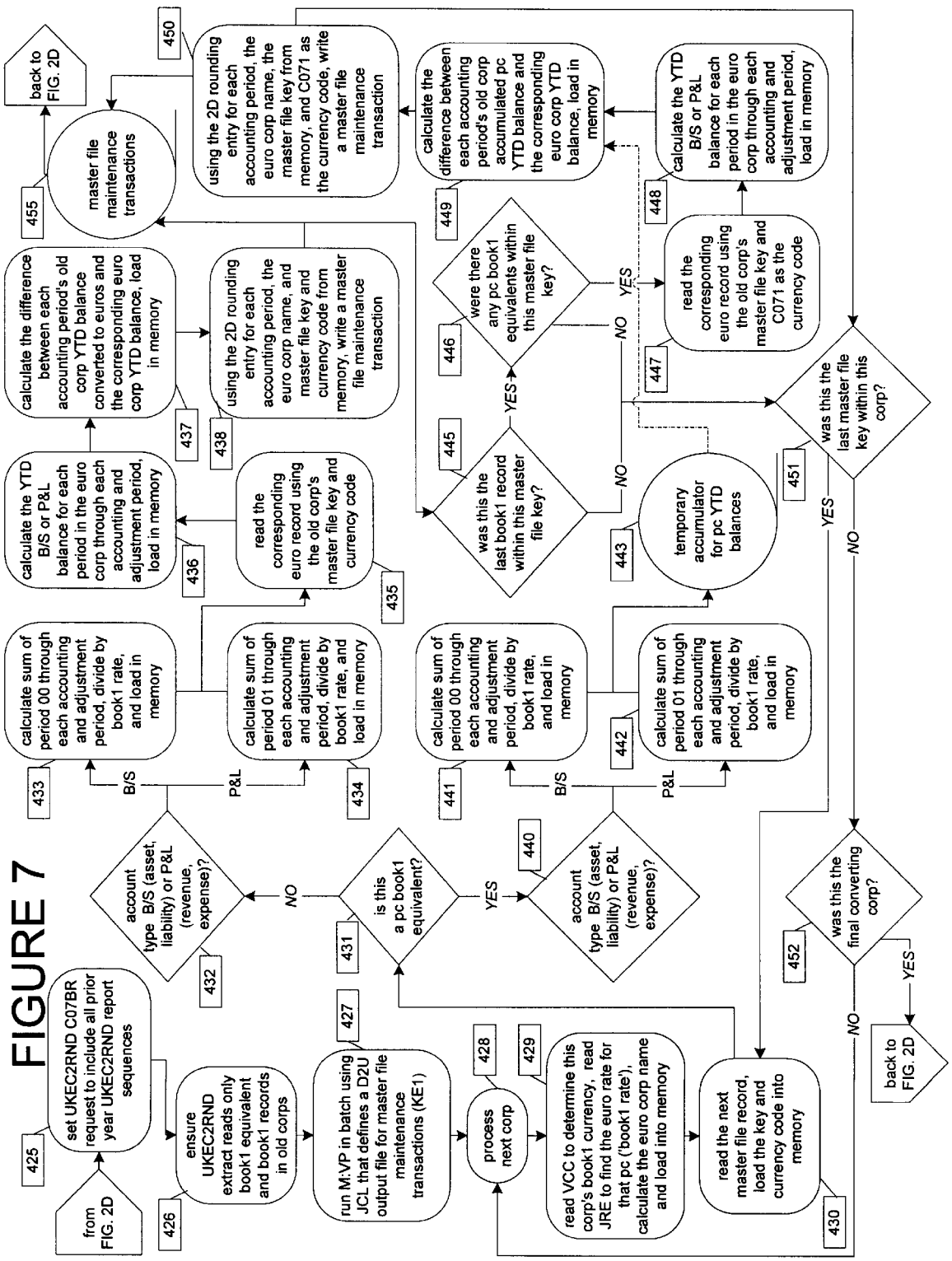

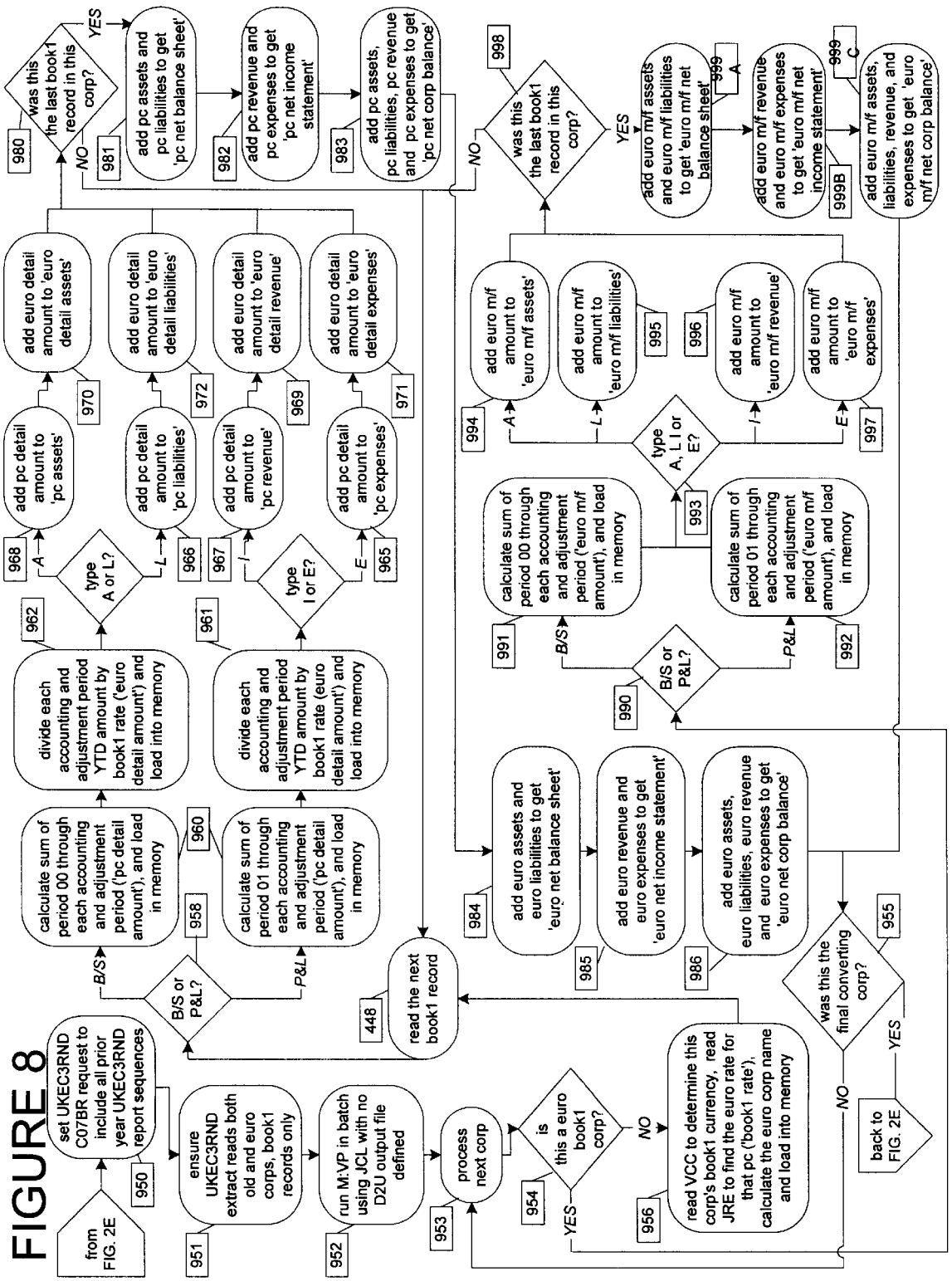

EURO BOOKING CURRENCY CONVERSION METHOD

BACKGROUND OF THE INVENTION

This invention relates generally to multi-currency production ledgers, and more particularly to methods of converting multi-currency production ledgers to accommodate the unification of several national currencies by respective participating states into a single currency.

With the advent of a global economy and associated global competition, nations in any particular locale are joining together to form unions. These unions may exist to foster greater security to union members strategically and/or economically. An example is the creation of the Economic and Monetary Union (EMU) in Europe. The EMU is a single currency area within the European Union single market in which people, goods, services and capital move without restrictions, through, among other things, the adoption of a unified currency, namely the euro.

The rules, institutions and objectives of EMU are set down in the Maastricht Treaty. The institution responsible for the promulgation and enforcement of the rules of the EMU is the European Commission (EC). The EC Council adopts all the legislation needed for the functioning of EMU, on the basis of proposals from the EC, which is made up of various officials from the participating states, notably the legal status of the euro and the irrevocable conversion rates between the euro and participating currencies, i.e. national currencies of participating states or nations.

The "euro" was introduced as the single currency of the EMU on Jan. 1, 1999 and has to date been adopted by 11 member or participating states. These are Belgium, Germany, Spain, France, Ireland, Italy, Luxemburg, the Netherlands, Austria, Portugal and Finland. The conversion rate between the respective participating nations' currencies and the euro has been permanently fixed and so will be stable by definition. For these participating states, the euro replaces the respective participating national currencies, in July 2002 at the latest, when banknotes and coins in national currencies are replaced by banknotes and coins in euro, and the national or participating currency units of the participating member states will definitely cease to exist in all their aspects. However, during the transitional period from Jan. 1, 1999 through Dec. 31, 2001, individuals and businesses may use either the participating national currencies or the euro.

Europe's private sector companies doing business with other participating and non-participating national companies can continue to use the participating and non-participating currencies in their bookkeeping up to Jan. 1, 2002. It will be necessary for the companies, however, to convert their ledgers at some time during the transition period. To evaluate records using participating currencies after Jan. 1, 2002, the participating ledger will have to convert entirely to the euro for all their bookkeeping. They are free to switch over to accounting and bookkeeping in euro at any convenient time during the three-year transitional period providing that this is consistent with national changeover plans.

Non-European based companies that receive payments in participating national currencies must also convert their accounting ledgers to accommodate the new single currency.

In most circumstances, the introduction of the euro will not mean replacing software and computer equipment, unless a company's normal replacement cycle falls within the transition period. However, it does involve a sometimes painstaking examination and amendment of computer programs to ensure that all currency references take account of the euro.

In accounting nomenclature, the term "general ledger" or "booking ledger" is a term of art, referring to individual amounts, and the journal entry transactions behind those amounts, that comprise the assets and liabilities in a particular balance sheet, and the revenue and expenses in a corresponding income statement. In a typical manual booking ledger, there exist many types of journal entries. Such a typical manual general ledger is usually formed by creating a grid system with vertical and horizontal lines meshing together to create boxes that receive account information, names, numbers, dates, numerical values, etc. Customarily, on the left hand side of the ledger is placed account names or numbers while account values known as "transaction currency records", are input horizontally across the ledger from left to right. Values can be added, converted, subtracted or totaled dependent upon the type of ledger. Separate accounts can be listed vertically from the top down.

In a ledger that contains multi-currency values, a particular transaction currency record is accompanied by its equivalent value in the "booking currency". The booking currency is the currency in which a particular business primarily deals. For example, if a company in France receives payments in various currencies, the booking currency would likely be in francs. A transaction with a U.K. company in British pounds would then be reflected in the ledger of the French company in GBP as the transaction currency record and the equivalent amount in French francs, the booking currency. This equivalent in francs is known as the "Book One Equivalent". Sometimes a business may have a "Book Two Equivalent" if the business carries its books in more than one currency.

In addition, each account has a "Book One Amount" that holds the total of all activity for one account regardless of what currencies comprised that activity. Sometimes a business may have a "Book Two Amount" if the business carries its books in more than one currency.

At some point during the European Monetary Union transition period, the booking currency of all participating European ledgers must be converted from their respective participating currencies to euros. Since most of today's businesses track their respective accounting using computer software designed for the task, the software must be updated to convert the value of accounts within a particular booking ledger from participating currencies to the euro. Prior to conversion, it is necessary for the booking ledger to contain values of many different entries in various participating foreign currencies. After the euro conversion, all currencies of the EMU member nations, i.e. participating currencies, need to be converted to Euros in the booking ledger, while non-member nation currencies must also remain in the ledger for consistent bookkeeping.

From a computer software standpoint the term "general ledger" refers to an entire set of files and record types that were designed to give the user sophisticated and wide-ranging control and reporting tools over a particular accounting ledger. The same computer programs now perform all mathematical operations on the data, calculate earnings, spending, profits, losses, and tax liability and perform a myriad of other functions necessary to allow easy access to information about the particular business.

Within the database of a particular business there exists a "master file", which typically contains a plurality of records including amounts from a company's general ledger. One master file record contains (1) a key identifying the record (comprised of a corporate identifier, user-defined key elements, and a currency code); (2) data fields, such as an account type, description, date opened, etc.; and, (3) amount fields, each assigned numeric field generally having 13 integers and up to 2 decimal places. Each record contains a large number of amount fields, one each for every accounting and adjustment period and period 00 for each amount class. Such a record may be represented as follows:

[CORP, USER-DEFINED KEY ELEMENTS, CURRENCY CODE, data fields, amounts fields----------------->]

|<- - - - - - - - master file key fields - - - - - - - - ->|

The term 'corp' is used as a corporate identifier to identify a particular company name. For example, for a farm equipment manufacturing company, Ajax, inc., the corp name in the United States might be AjaxUS. The corp name for the French division of the business might be AjaxFrance. A master file typically contains the records of all the general ledgers of all of the corps of a particular business. In other words, each of these 'corps' have separate accounting ledgers, however, they can be included in one master file.

The 'currency code' is an identifier of the currency in which the record is stored. If Ajax, Inc. has a transaction record with the currency code as U.S. dollars, then the amount of the transaction record value in the amounts field is expressed in U.S. dollars.

The 'user defined key elements' are based largely on the needs of a particular business and the types of reporting they require. Each user determines the number and the nature of the fields that form the structure of its unique identifiers for each master file record in their ledger. For example, Ajax, Inc.,firm might use ACCOUNT, CENTER, PRODUCT, and LOCATION. For another example, a bank might use ACCOUNT, BRANCH and CENTER as the user defined key elements.

Prior to the rise of packaged general ledger software in the 1970's, manual general ledgers included a 'Chart of Accounts', which was simply the list of all valid accounts that could be used in the ledger.

For Ajax, Inc., the Chart-of-Accounts might look like this;

| ACCOUNT | CENTER | PRODUCT | description | account type |
|---------|--------|---------|-------------|--------------|
| 10001 | CORP | | cash in bank | asset |
| 10002 | CORP | | accts receivable | asset |
| 20001 | CORP | | accts payable | liability |
| 20002 | CORP | | stockholder equity | liability |
| 40001 | CORP | TRCTR | sale | revenue |
| 40001 | CORP | HARVTR | sales | revenue |
| 40002 | CORP | TRCTR | lease | revenue |
| 40002 | CORP | HRVTR | lease | revenue |
| 50001 | CORP | | rent | expense |
| 50002 | ACTNG | | wages to employees | expense |
| 50002 | ADMIN | | wages to employees | expense |
| 50002 | CORP | | wages to employees | expense |
| 50002 | SALES | | wages to employees | expense |

Where the Chart of Accounts was a list of all the valid accounts for a ledger, the 'Chart of Values' subdivides the Chart of Accounts into valid values for each of its component parts. Our example of a key using ACCOUNT, CENTER, and PRODUCT might contain the following valid values:

| ACCOUNT: | 10001 | asset | cash in bank |
| --- | --- | --- | --- |
| | 10002 | asset | accounts receivable |
| | 20001 | liability | account payable |
| | 20002 | liability | stockholder equity |
| | 40001 | revenue | sales |
| | 40002 | revenue | lease |
| | 50001 | expense | rent |
| | 50002 | expense | wages to employees |
| CENTER: | ACTNG | accounting | |
| | ADMIN | administration | |
| | CORP | corporate headquarters | |
| | SALES | sales | |
| PRODUCT: | TRCTR | tractors | |
| | HRVTR | harvester | |

A database that holds the Chart-of-Values is still used in ledgers because of efficiency in setup. In the above example there are 64 potential master file keys (8 accounts times 4 centers times 2 products), but only 14 records are needed for set up, as discussed below, to build them as they are needed.

With the above terms and definitions discussed in mind, the conversion of multi-currency ledgers to accommodate the unification of several national currencies by respective participating states into a single currency, e.g. the euro, requires consideration of several accounting software user's needs.

In particular, in the case of the EMU and the conversion of the participating currencies to the euro, for European based ledgers, it is necessary to provide a migration path to a euro ledger in which all ENU transaction currency records and their book one equivalents are eliminated. After Jan. 1, 1999, the old currency of the participating nations became euros. In the euro ledger, these records are unnecessary. Maintaining activity in the new euro ledger after Jan. 1, 1999, in anything but euros, is in fact, redenominating a balance, in what has been converted in euros, back into pre-EMU currency.

For non-European ledgers using EMU currencies, it is also necessary to provide a migration path to convert EMU currency activity to euros. The conversion rates for EMU currencies into any other currency are not available after the end of the transition period. As a result, ledgers that book in an "out" currency (for example, a USD enterprise with activity in EMU currency) will be unable to produce the required monthly currency revaluation gains/losses after the euro transition period is complete. This is an insurmountable obstacle for every non-European computer software ledger user that processes transactions in EMU currencies, regardless of whether they are converting any ledgers to euros.

Additionally, exact conversion of a participating member nation's currency to euros can never be accomplished. An unavoidable error will occur during the conversion due to the fact that individual currencies do not divide into curos in whole numbers. Therefore, some error will occur during the conversion. At some point a rounding function must occur.

The Business & Accounting Software Developers' Association (BASDA), sets guidelines for the development of accounting software. In BASDA's White Paper, October 1998, "The Change Over to the Euro: Implications for UK Business", there are standards published which must be complied with in order to be within the EC Council rules for rounding. Any advanced rounding adjustments after converting all open balances to be posted to separate accounts are mandatory. Rounding is governed by E.C. Council Regulation No. 1103/97 (Jun. 17, 1997). Article 5 of that regulation states:

Monetary amounts to be paid or accounted for when a rounding takes place after a conversion into the euro unit pursuant to Article 4 [article 4 defines triangulation rules] shall be rounded up or down to the nearest cent. Monetary amounts to be paid or accounted for which are converted into a national currency unit shall be rounded up or down to the nearest sub-unit or in the absence of sub-unit to the nearest unit, or according to national law or practice to a multiple or fraction of the sub-unit of the national currency unit. If the application of the conversion rate gives a result which is exactly half-way, the sum shall be rounded up.

For example:

if after conversion the amount is EUR 1.455, this would be rounded to EUR 1.46;

if the amount is EUR 1.457, the rounded sun is EUR 1.46;

if the amount is EUR 1.454, the rounded sum is EUR 1.45;

for conversions from the euro to a national currency, the same rounding rule applies to the lowest sub-unit of that currency, e.g. pfennig for the Deutschmark or centime for the French franc.

While the regulation is simple and straightforward, issues still arise. The E. C. White Paper "Preparing Financial Information Systems for the euro", XV/7038/97, Brussels, Dec. 15, 1997, gives examples of situations where unavoidable rounding differences crop up. Rounding problems can occur when converting individual items and cumulative amounts based on the same items to euro. Take the following example:

Assume the following conversion rate: EUR 1=DEM 1.93805

|  | DEM |  | EUR |
| --- | --- | --- | --- |
| Item #1 | 100,000.00 | = | 51,598.26 |
| Item #2 | 100,000.00 | = | 51,598.26 |
| Item #3 | 100,000.00 | = | 51,598.26 |
| Item #4 | 100,000.00 | = | 51,598.26 |
| Total | 400,000.00 | = | 206,393.04 |
| Check | 400,000.00 | = | 206,393.02 |
| Difference | 0.00 |  | 0.02 |

Applying the conversion and rounding rules to individual items and adding up the individual outcomes does not necessarily lead to exactly the same outcome as applying the rules to the cumulative amounts. This in itself is not new, but may still lead to confusion in certain cases, for example:

Enterprise B has bought goods from enterprise A in four lots. Enterprise A has recorded the sales individually at EUR 206,393.04. However, when enterprise B pays for the goods by means of one payment it will pay "only" EUR 206,393.02.

In the case of accounting software, problems could arise when the debits and the credits in one journal entry, once converted into euro, no longer add up to zero due to rounding inconsistencies. The accounting software will only allow such a journal entry to be recorded when the rounding difference is allocated to a special account in the balance sheet or profit and loss account.

This example illustrates one type of rounding error that may be encountered during ledger conversion, where the euro 'balance' for one computer software general ledger account is actually made up of a series of converted period net activity amounts.

As a result, during any conversion routine it is necessary to provide a method to correct accumulations of intra-record rounding errors (or $2^{nd}$ dimension rounding). A conversion routine without intra record rounding can cause incorrect balances in the ledger after conversion. Intra record rounding entries update those balances, and must therefore meet the same stringent audit trail requirements as any other activity in the ledger. Due to the volume of rounding entries required for a ledger, it is desirable that the intra record rounding process be automated.

For example:

The simplest of users, converting three years of only one amount class for one corp, must modify and run this report 36 times to see the tens of thousand of rounding errors likely to exist in the converted ledger.

A more typical users, converting two amount classes for a dozen corps that each have two adjustment periods, must run a report over a thousand times to see rounding errors in the euro corps.

In addition, the master file records that comprise reporting subtotals can contain accumulations of rounding errors down thorough many accounting keys. Any conversion routine must also provide a method to correct intra-ledger accumulations of rounding errors or risk out of balance ledgers. In fact any conversion routine must contain such a method to be within the BASDA requirements. BASDA Requirement 1.1.3.4 for the certification of euro conversion software states:

Where applicable, a method will be available to post the rounding difference to the trial balance after conversion to make it balance.

This requirement is mandatory to meet the lowest level of product certification from BASDA. In the absence of such a method a user must determine the cause of any imbalance in condition and develop an auditable method for calculating and entering corrections.

Another need to be considered is the desire of users converting their ongoing production ledgers to a euro master file without having to develop a new program.

Another user consideration in connection with the implementation of a currency conversion routine for an old corp production ledger processing in a participating currency to an ongoing production ledger processing in euro concerns those users using a single currency ledger denominated in an EMU participating national currency. Any conversion routine for this type of user requires a migration path from the single currency ledger operating in an EMU participating national currency to a single currency ledger operating in euro.

Yet another user consideration concerns those users with multi-currency ledgers where all activity is in EMU currencies. Any conversion routine for this type of user requires a migration path from the multi-currency ledger operating with all activity in EMU participating national currencies to a single currency ledger operating in euro.

Still another user consideration is to accomplish the conversion of the production ledger in the shortest amount of time.

To function, a user must retain the ability to book transactions in participating currencies during the entire transition period since any other company which the user transacts business may delay converting to euros until the very last day of the transition period.

SUMMARY OF THE INVENTION

It is therefore an object of the present invention to provide a new and improved booking currency conversion method for automatically converting an ongoing old corp production ledger processing in a participating currency to an ongoing production ledger processing in a target currency where the old corp production ledger contains an old master file including a plurality of old master file records, each old master file record comprising a key identifying the record, data fields and amount fields.

Another object of present invention is to provide a new and improved booking currency conversion method in which conversions of the old corp production ledger are accomplished automatically in ongoing booking ledgers while providing an efficient resulting converted booking ledger.

Another object of the present invention is to provide a new and improved computerized method for converting an ongoing old corp production ledger processing in a participating currency to an ongoing production ledger processing in the new euro currency and using a computer software program to automatically accomplish the conversion.

Another object of the invention to provide a method for converting an ongoing European based production ledger, which includes a migration path to a euro ledger in which all EMU transaction currency records and their book one equivalents are eliminated.

Still another object of the invention is to provide a method for converting an ongoing non-European ledger using EMU currencies, which includes a migration path to convert EMU currency activity to euros.

Yet another object of the invention is to provide a method for converting an ongoing production ledger wherein exact conversion of a participating member nation's currency to euros can be accomplished.

Another object of the invention is to provide a method for converting an ongoing production ledger wherein users that wish to convert their ongoing production ledgers can create a euro master file without developing their own program and without restrictions caused by charts of values that may not be synchronized with the master file at the time of the conversion.

Still another object of the invention is to provide a method for converting an ongoing production ledger using conversion software designed to convert an old corp production ledger processing in a participating currency to an ongoing production ledger processing in euro currency and wherein the user uses a single currency ledger denominated in an EMU participating national currency.

Yet another object of the invention is to provide a method for converting an ongoing production ledger using a computer software that includes a migration path from the multi-currency ledger operating with all activity in EMU participating national currencies to a single currency ledger operating in euro.

Still another object of the invention is to provide a method for converting an ongoing production ledger which accomplishes the conversion of the production ledger in the shortest amount of time.

Yet another object of the invention is to provide conversion method that creates a more efficient resulting booking ledger containing non-participating currency entries individually, and all participating currency entries represented in euro in one entry.

It is also an object of this invention to provide a conversion method that creates an efficient euro currency booking ledger without prior participating currencies remaining in the final ledger.

It also an object of this invention to provide a conversion method that creates a euro booking ledger having the ability to create reports detailing prior, current and future amounts of currency within the ledger.

Another object of this invention is to provide completely automated intra records rounding tools.

Another object of the invention is to provide tools to identify and create intra ledger rounding entries as quickly as possible.

These and other objects are attained by providing a method of converting an ongoing old corp production ledger processing in a participating currency to an ongoing production ledger processing in a target currency where the old corp production ledger contains an old master file including a plurality of old master file records, each old master file record comprising a key identifying the record, data fields and amount fields.

In accordance with this invention the ongoing old corp production ledger is converted by the steps of providing an ongoing old corp production ledger processing in a participating currency having an old master file including a plurality of old master file records, each old master file record comprising a key identifying the record, data fields and amount fields, selecting a target currency, selecting a particular time period within which conversion is accomplished, providing a target currency master file that is substantially identical to the old currency master file, such that said target currency master file contains as least one target currency corp record corresponding to each old currency master-file corp record within the old currency master-file, providing zero balances within each target currency corp records within the target master file, providing all participating transaction currency records and their book one equivalents within one old master file key that are replaced by a single target transaction record and its book one equivalent, converting all transaction currency records and their book one equivalents for the selected time period into their corresponding target currency equivalents, rounding said target currency equivalents, and populating the target currency master file corp records within the target master file with the corresponding rounded target currency equivalents.

Specifically, this invention automatically creates a converted booking ledger that contains entries representing all non-participating currencies and all participating currencies converted to the target currency. The resulting converted booking ledger created by this invention is devoid of duplicate entries representing pre-conversion values of the participating nations' currencies for current and future year amounts. This feature frees up a large amount of physical space in a database, minimizes the amount of information required to formulate efficient accounting reports and thereby saves the user time and money.

The unnecessary EMU transaction currency records and their book equivalents can comprise up to 95% of the converted euro master-file. With large businesses that have thousands of records to book this can cause extremely large converted euro master files taking up valuable space on computer networks and creating lag time in gathering information from the database.

Failing to eliminate these unnecessary EMU transaction currency records and their book one equivalents will cause users to experience unchanged runtimes, when they were expecting dramatic reductions in processing times and cost overhead.

Another aspect of the present invention is the automatic correction of intra record accumulation of rounding errors and the automatic correction of intra ledger accumulation of rounding errors.

Yet another aspect of the present invention is a new and improved software Procedure Definition Language program known as EUROCOPY™ that allows a user to create a euro master file that is devoid of duplicate entries representing pre-conversion values of the participating nations' currencies for current and future year amounts without developing their own program and without restrictions caused by charts of values that may not be synchronized with the master file at the time of the conversion.

currency located in the production region remain active for day-to-day processing. In the test region a Production Definition Language (PDL) program known as EUROCOPY uses the master file records of the old corps to create corresponding master file records for the euro corps, and all records associated with all old corps are moved to their corresponding new euro corps. The conversion from the old corp with a particular master file key would like the following:

| Old master file key | | | Curr | converts to | Euro master file key | | | Curr |
|---|---|---|---|---|---|---|---|---|
| 1234500 | 0001 | 123456 | 1 | | 1234500 | 0001 | 123456 | 1 |
| 1234500 | 0001 | 123456 | DEM | | 1234500 | 0001 | 123456 | EUX |
| 1234500 | 0001 | 123456 | DEMI | | 1234500 | 0001 | 123456 | EUXI |
| 1234500 | 0001 | 123456 | DJI | | 1234500 | 0001 | 123456 | DJI |
| 1234500 | 0001 | 123456 | DJI1 | | 1234500 | 0001 | 123456 | DJI1 |
| 1234500 | 0001 | 123456 | FRX | | none-see below | | | |
| 1234500 | 0001 | 123456 | FRX1 | | none-see below | | | |
| 1234500 | 0001 | 123456 | ITL | | none-see below | | | |
| 1234500 | 0001 | 123456 | ITL1 | | none-see below | | | |
| 1234500 | 0001 | 123456 | USD | | 1234500 | 0001 | 123456 | USD |
| 1234500 | 0001 | 123456 | USDI | | 1234500 | 0001 | 123456 | USDI |

An example of one master key's records being created (still with 0.00 amounts at this stage) in the euro corp master file.
The 'EUX' and 'EUX1' records will later be populated with totaled amounts from the source corp's participating currency records.
FRX (French francs as a transaction currency within an RFR corp), ITL (Italian lira) and DEM (German marks) are participating euro currencies.
USD (U.S. dollars) and DJI (Djibouti francs) are non-participating currencies.

An existing ongoing old corp production ledger processing in a participating nation's currency is provided. In order for any conversion routine to be executed the files must be locked so that the data cannot be modified while the conversion is executing. As a practical matter, the files containing prior year records can be converted during day-to-day production ledger processing as long as the prior year amount classes have been locked against further journal activity. However, all current and future year files cannot be locked without interfering with the day-to-day production ledger processing. As a result any conversion process executed on the current and future year ledgers must be done during a period in which no activity is conducted, such as over a weekend. That time period is known as 'production cutover'. During production cutover all old corps' records are locked against future activity. This requires that the entire conversion process must be completed over a short period of time, namely from about 5 PM on a Friday afternoon to about 9 AM Monday morning, in order to avoid system down time.

However, the prior year, since the ledger is mostly complete for this time period, can be locked and converted at any time before production cutover. This time period is known as 'pre-cutover preparation'. During the pre-cutover preparation all prior year old corps' records are locked against further activity and the conversion process can begin. Meanwhile, the current and future year ledgers remain in day-to-day processing until the production cutover period.

During pre-cutover preparation, the ongoing old corp production ledger processing in a participating nation's currency is copied in its entirety to a non-production or test region, while all prior year amount classes are locked against further journal activity in the production region. All current and future year amount classes in the ongoing old corp production ledger processing in a participating nation's The book one currency is then changed from the pre conversion participating national currency to euros in the euro corps. Additionally, here the automatic generation and combination checking features are deactivated within the ledger software, allowing the EUROCOPY program to create the euro master file corresponding exactly to the old corp's master file without regard to the Chart of Values discrepancies.

Within one master file key, the PDL program then replicates every book one, non-participating currency and non-participating currency book one equivalent record into the euro master file. The first participating currency (including euro) record encountered by the PDL program causes one euro transaction currency record and its book one equivalent to be created. The PDL ignores all other participating currency records within that master file key. However at this point in the euro master file, all amount classes contain zero amounts that will be populated by the converted amounts in a later step.

The old corp amounts of the prior year in the test region are extracted and then converted to the corresponding euro values followed by a migration of the amounts to the corresponding location in the euro master file. The location of the converted values in the euro master file depends upon their characteristics.

All non-participating currency transaction currency records and statistical accounts are copied to the maintenance transaction as is, without amount conversion.

All non-participating equivalent records and book one records in the old corp are expressed in the old booking currency and therefore need to be converted. The source amount is divided by the euro conversion rate, rounded to two (2) places, and written to the maintenance transaction.

All participating currency transaction currency equivalent records are converted by dividing the amount by the euro conversion rate, rounding to two (2) places, and adding the result to a running total referenced as EUX for a euro transaction currency book one equivalent amount. After all records have been processed for the master file key, that running total is written to the maintenance transaction for EUX.

All participating currency transaction currency records are ignored. By definition the number of transaction currency euros must equal the number of transaction currency equivalent euros because the booking currency of the corp is now euros. By using the reference EUX? in the output maintenance transaction from the previous step, both the EUX and the EUX1 records in the euro corp's master file will be updated with the same euro amount.

The amounts posted to the euro ledger may contain incorrect values at this point due to the previously discussed accumulations of rounding errors. Known as intra-record rounding or second dimensional rounding, the year-to-date balance rounding errors are evaluated by comparing the year-to-date balances in the euro corp against year-to-date balances from the old corp records. If one or more rounding errors are found within one master file key, the report creates a master file maintenance transaction with the correcting entries.

As the above steps are executed in the test region during pre-cutover preparation for the previously locked prior year amount classes, day-to-day processing continues in the ongoing production ledger in the participating currency for the current year in the production region. When a converted euro corp with prior year amounts is complete, production cutover can occur.

At the production cutover, the ongoing production ledger locked to prior year activity is copied along side the converted euro corps with prior year amounts in the test region. All old corps in the production region are locked against further activity. Conversion of the current and future year amounts for the euro corps is executed and the euro master file is updated to include the values. Intra-record and intra-ledger rounding adjustments for current and future year amounts are created and entered to the euro corps.

The converted and rounded euro corps for all years and amount classes are migrated back to the production region. The fully converted and functional euro corps and the old corps locked against further activity remain coexisting in the ongoing production ledger which is now processing in euros. Although the old corps are locked against further activity they remain to allow for reporting and information gathering purposes.

BRIEF DESCRIPTION OF THE DRAWINGS

FIGS. 2A–2I are flowcharts showing the pre-cutover preparation of FIG. 1 in greater detail.

FIG. 7 is a flowchart showing the EURO2RND program for intra-record or $2^{nd}$ dimensional rounding of FIG. 2D in greater detail.

FIG. 8 is flowchart showing the EURO3RND program for intra-ledger or $3^{rd}$ dimensional rounding of FIG. 2E in greater detail.

DESCRIPTION OF THE PREFERRED EMBODIMENT

Figure 1:
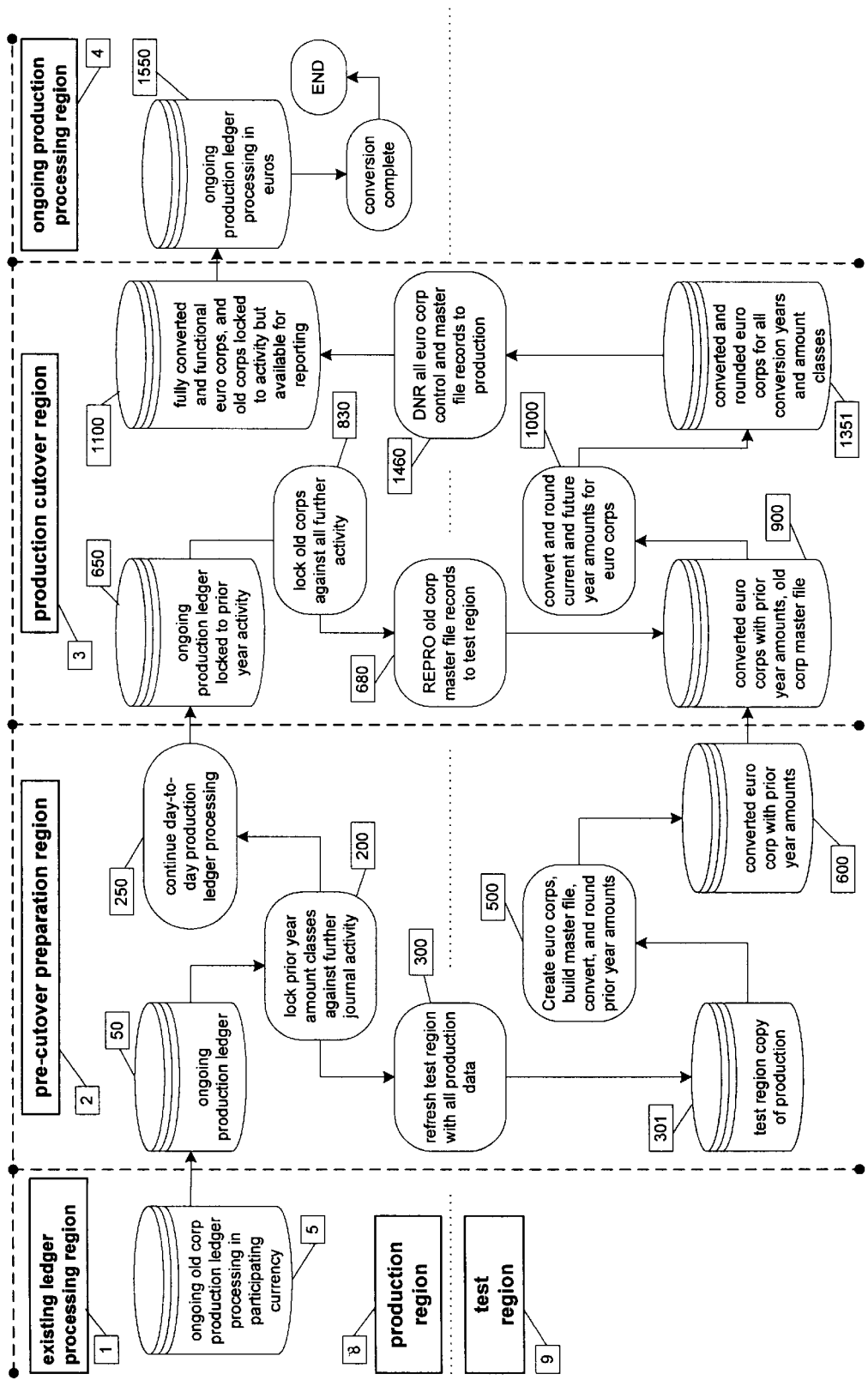
FIG. 1 is a summary flowchart of the data flow according to method of converting.

Initially although the preferred embodiment comprises a booking ledger conversion method designed specifically for the euro, it will be understood that it is not necessary that the target currency for this invention be the euro. Other economic unions may be formed in other parts of the world for which this invention can be used While the method may be utilized in connection with any of the currently available general ledger software products on the market today, the preferred embodiment of the invention constitutes a method designed for use with the Millennium line of software made by Geac Corporation, Inc. of Toronto, Canada.

This particular line of software, known as the M series (M stands for Millennium), is widely used and respected in the accounting industry. The M series has been the standard for over 10 years in accounting computer programs. The M series contains various software applications that may be customized for an individual business. Two of those applications include the General Ledger Application or "GL:M" and the Currency Management Application or "CM:M". GL:M is an application that provides a standard booking ledger and is among the best and most respected packaged general ledger software packages on any platform. CM:M is an application that provides currency conversion operations for the GL:M package allowing businesses with multi-currency ledgers to correctly book all transactions and their book one equivalents. The preferred embodiment of the invention utilizes the advantages of inherent features of the pre-installed software applications, GL:M, CM:M and other systems, resulting in a converted booking ledger that is customized for the users' requirements.

Some features that are inherent in the GL:M system can be modified. Such a feature desired by users applying a currency conversion method based on the GL:M package is to create a euro master file without developing their own program or depending on Automatic Generation. Automatic Generation, or 'Autogen', is an optional process in the GL:M package that creates master file records automatically when they are first required (for example, when a journal hits a non-existent master file key), as opposed to the user being required to create them. Autogen keeps the master file as small as possible for overall processing efficiency.

Any entry to the ledger always holds the master file key to which the amounts should be posted. When the system processes a journal entry Autogen goes through a number of steps including determining whether the master file key, where these amounts belong, already exists. If the master file key does exist then Autogen posts the amounts and moves on to the next entry. Next, using the Ajax, Inc. example, Autogen determines whether the ACCOUNT value exists on the Chart of Values ("VCV") for the ACCOUNT key element. If no such ACCOUNT value exists on the VCV, Autogen issues a message that the account is invalid. If the ACCOUNT does exist, Autogen determines whether the CENTER value exists on the VCV for the CENTER element. If no such CENTER value exists Autogen issues a message that the center is invalid. If the CENTER value does exists then Autogen determines whether the PRODUCT value exist on the VCV for the PRODUCT element. If no such PRODUCT value exists Autogen issues a message that the product is invalid. If the PRODUCT value exists, the procedure continues.

When a new entry is processed for a record that already exists, GL:M simply posts the amount to the record and moves on to the next entry, so Autogen might never again be performed on that record. However, the user can specifically request a repeat of the process.

Over time, users modify various field values on individual master file records using values that do not match the VCV. Such changes are useful for controlling ledger functions such as reporting and cost allocations. Unless the user maintains the underlying VCVs at the same time, large volumes of master file records cease to be synchronized with the VCV. Because the master file itself is more critical to ledger processing than the VCV, placing a low priority on synchronizing the master file to the VCV is common.

An additional option that can be used only in conjunction with Autogen that tests whether combinations are valid as group is known as 'combination checking'. This test is performed against records representing valid combinations that the user maintains and controls. If combination checking is used, Autogen performs the final step of determining whether, taken together as a group, the ACCOUNT, CENTER and PRODUCT values are a valid combination. If they are not Autogen, issues an invalid combination message. If they are, Autogen inserts the record, updates it with the journal entry's amounts, and moves to the next entry.

Users' requirements dictate that the conversion routine must be able to execute without relying on the Autogen feature as because there typically are discrepancies between a particular user's master file and the Chart-of-Values, on which Autogen depends. With Autogen deactivated the user need not be concerned with these discrepancies because every record that exists in the old production ledger will exist in the new euro ledger with exactly the same data fields values, except that old corp EMU currency records are rolled into euro records if the user selects that option. The process creates a euro master file that is blind to any VCV discrepancies. The resulting euro master file bears the same relationship to the VCV as the old corp's master file regardless of the level of synchronization the user maintained prior to creating the euro master file records.

Summary Flowchart

Referring now to the drawings wherein like reference characters designate identical features throughout the several views, and more particularly to the summary flowchart of FIG. 1, an ongoing old corp production ledger (Box 5) processing in a participating currency is provided as the existing ledger (Box 1) is active for day-to-day transactions, also known as the production region (Box 8). A test region (Box 9), in contrast with the production region, identifies a region where no activity occurs within a ledger disposed therein. Such as when refreshing the test region with all production data (Box 300), a test copy of the old corp production ledger (Box 301) is created in the test region.

During the pre-cutover preparation (Box 2) period all prior year amount classes are locked against further journal activity (Box 200). Throughout the pre-cutover preparation period, the old corp production ledger (Box 5) continues in day-to-day production ledger processing (Box 250).

From the test region copy of the old corp production ledger (Box 301), new euro corps are created and a master file is built with prior year amounts converted and rounded (Box 500) in accordance with the invention resulting in a converted euro corps ledger with prior year amounts (Box 600). The steps that create new euro corps and build a master file with converted and rounded prior year amounts (Box 500) are explained in further detail below and referred to in FIGS. 2C through 2E.

At this point the production cutover (Box 3) period begins. In the production region an ongoing production ledger locked to prior year activity (Box 650) remains. The ongoing production ledger locked to prior year activity (Box 650) is copied to a test region by means of REPRO (Box 680) and will coexist in a test region (Box 900) with converted euro prior year amounts.

In accordance with the invention, the test region/the combined converted euro corps ledger with prior year amounts and old corp master file (Box 900) is converted and rounded in the current and future year amounts for euro corps (Box 1000) to create converted and rounded euro corps for all conversion years and amount classes (Box 1351).

The steps that create new euro corps and build a master file with converted and rounded current and future year amounts (Box 1000) are explained in further detail below and referred to in FIGS. 9A through 9C.

Converted and rounded euro corps for all conversion years and amount classes (Box 11351) are migrated back to the production region via the Millennium Tool DNR (Box 1460) creating a fully converted and functional euro corps ledger containing old corps locked to activity but available for reporting (Box 1100).

Post production, the fully converted and functional euro corps ledger and old corps, locked to activity but available for reporting (Box 1100), becomes an ongoing production ledger processing in euros (Box 1550) in the ongoing production processing region (Box 4).

Pre-cutover Preparation

Referring to FIG. 2A, during pre-cutover preparation in the production region ongoing production ledger (Box 5) all prior year journal are corrected and posted (Box 70). No prior year journals can be allowed to post in production after the conversion process begins, because there is no way to simultaneously post them to the euro corps while still ensuring that year-to-date ("YTD") and account type subtotals for reporting are rounded correctly. Use a query or report to find all unposted online journals. Use the journal effective date rather than the journal type to find last year's unposted journals. A journal with an effective date in the prior year could theoretically have been entered as a current year journal and remained on the file as such over the year-end.

Back up all production Millennium and application files using the standard production backup routines.

Refresh the test region with production data (Box 300) using the Millennium View Print ("M:VP") utility IDCAMS REPRO or a similar utility, copy all production ledgers files, GL:M, Millennium, and M:VP files to the test region (Box 302). Sequential files do not need to be moved. Delete and define the batch recycle file in the test region. Filters do not need to be run at any point during the pre-cutover preparation process.

Back up the test region, including all ledger files. Journal history need not be included in this or any other backup of the test region.

In production, deactivate all prior year amount classes (Box 200) that will be converted to euros. Deactivating the amount classes prevents further prior-year ("L1") activity to the amount classes that are going to be converted to euros. Only amount classes that are being converted for the euro corp master file require deactivation, but other L1 amount classes can be deactivated at the same time if desired.

Average (L1A) amount classes do not require maintenance. Older amount classes (L2, L3 etc.) cannot be posted to and, for euro conversion purposes, require no protection.

For each corp being converted, a master file maintenance transaction ("V1M1L") sequence is set up for each amount class that is going to be deactivated, specifying a new activity switch setting of '4' (totally inactive). Wildcard the entire master file key in each sequence using question marks.

After creating the V1M1L maintenance transactions, activate master file maintenance for each corp and submit the master file maintenance program.

Back up production GL files using the standard production GL backup routine. After this backup, production is available for normal processing again until the production cutover begins.

In the test region, move old corps in their entirety to their corresponding new euro corp names. Run M:VP request EUROVML (Box 320) no output file defined which creates a report, EUROVLML, as an audit trail of old corp currency records (Box 322).

Still referring to FIG. 2A, run corp maintenance program (Box 360) to move all old corp control and master file records to euro corp names.

Move Detail

Figure 3:
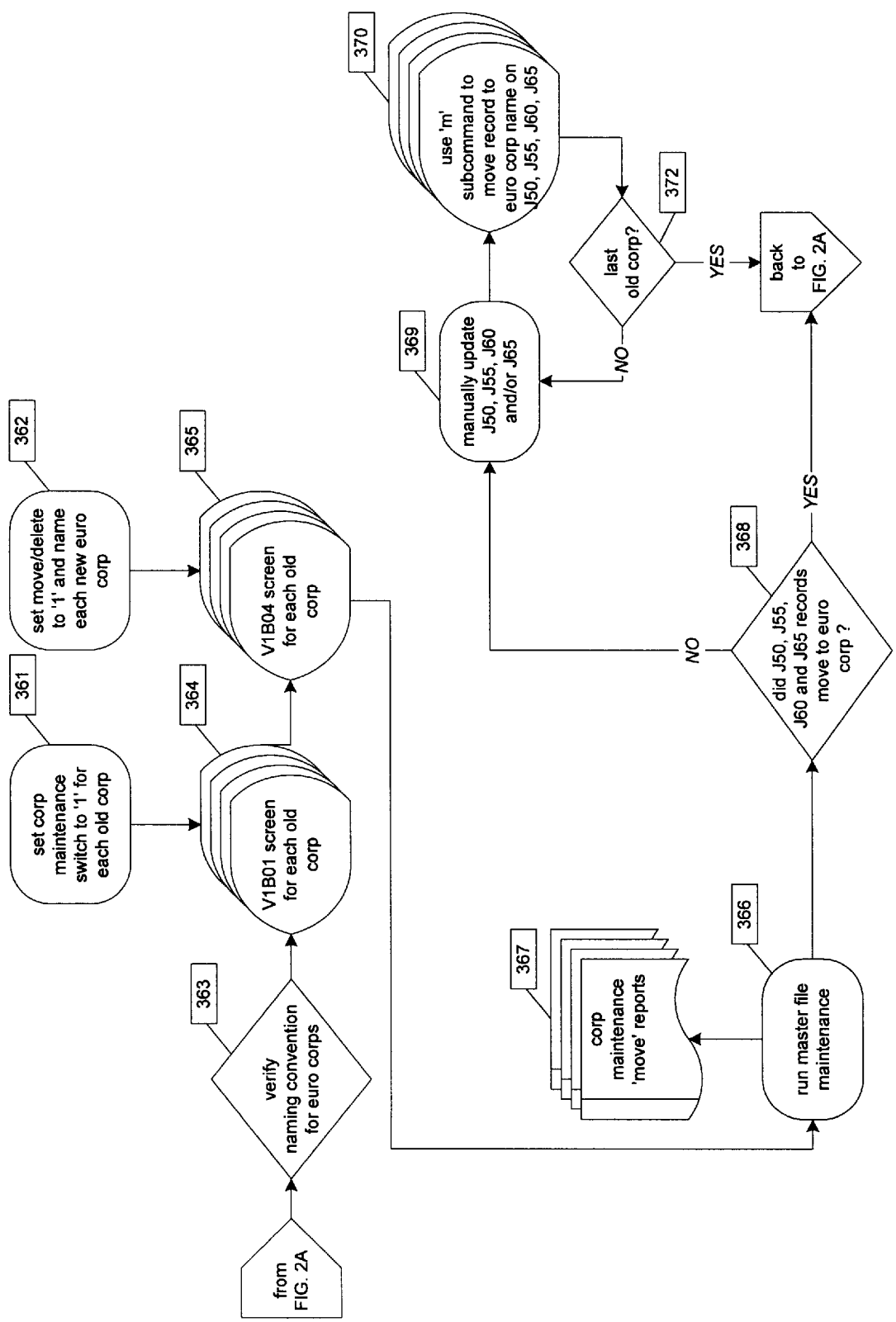
FIG. 3 is a flowchart showing the corp move of FIG. 2A in greater detail.

Referring to FIG. 3, Geac's corp maintenance program (V3ACCS) will move all records associated with a corp to the new corp name. Using the corp move program is a fast and accurate way to build the new euro corps while ensuring that they are identical to their corresponding old corps.

Establish a naming convention for the euro corps (Box 363). Request the move on the V1B01 (Box 364) and V1B04 (Box 364) screens for every old corp that is being converted to a euro booking currency corp. After requests have been established for all corps, run the V3ACCS (corp maintenance) program (Box 366) to create corp maintenance 'move' reports (Box 367).

Still referring to FIG. 3 determine whether the corp currency records, J50, J55, J60 and J65, records moved to the euro corp (Box 368). If they did not move manually update the J50, J55, J60 and J65 records (Box 369). Gather the next old corp on the currency control screen (Box 371). Determine whether there exists anymore old corp records (Box 372).

In the test region, verify sharing/model corps. After the moves are complete, browse all new corps on the corp control screen ("VCC01") to make sure that the names of 'model' corps still make sense. If at the time this conversion is executed, a subordinate corp points to another processing corp for one or more sets of rules, and that the 'model' corp is also being moved to a new corp name, the 'model' corp names on the VCC01 for the subordinate corp must be changed.

In test replace another corp control screen ("VCC03") for each new corp. After verifying each corp on the VCC01, browse the entire set on the VCC03 and perform a Millennium 'R' eplace on each one to replace various background data correctly. Set the reporting column to period 12 (or your last accounting period) of the prior year while performing the replace.

Referring to FIG. 2A, GL master file euro corps only (Box 542), GL control file euro corps only (Box 541) and the currency control file for the euro corps only (Box 540) are combines.

In test, change all corp book one currency codes to EUR (Box 550).

Figure 4:
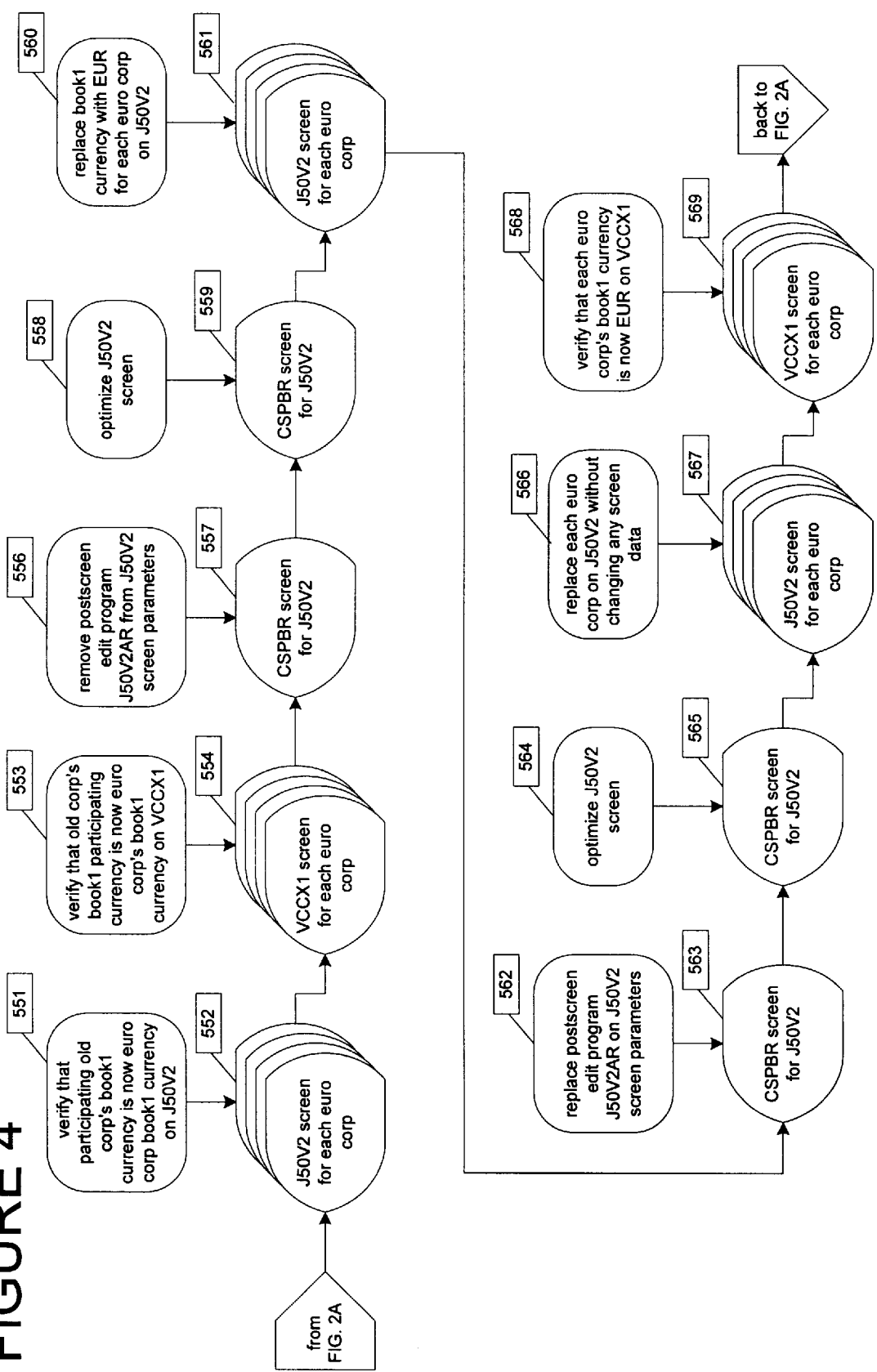
FIG. 4 is a flowchart showing the Book One Currency Code change of FIG. 2A in greater detail.

Referring to FIG. 4, the book one currency for each new corp on corp control screen J50V2 is provided (Box 552). Standard edits behind this screen prohibit changing the book currency for a corporation once it has been established. There are good reasons why this edit exists, including the fact that both the master file records for the corp and the amounts in those records would be wrong as a result of changing it during normal processing. Because all amounts in the master file are still zeroes, it is acceptable to bypass the standard edits to replace the book currency.

In order to allow the book currency to be changed, this task requires the following steps. Verify old book one currencies for each new corp on screen J50V2 (Box 551). Verify old book one currencies for each new corp on screen VCCX1 (Box 553). Remove J50V2 postscreen edit program (J50V2AR) (Box 556) on the Millennium screen parameters CSPBR (Box 557). Optimize screen J50V2 (Box 558). Perform a Millennium replace on J50V2 with 'EUR' as book one currency for each new corp(Box 560). Reattach J50V2 postscreen edit program on CSPBR (Box 562). Optimize screen J50V2 (Box 564). Perform a Millennium 'R' eplace on J50V2 for each corp without changing any values (this rewrites the VCC currency information) (Box 566). Verify each new corp's 'EUR' book one currency code on VCCX1. (Box 568).

Referring to FIG. 2A, after the above steps, in the test region a GL master file (Box 602), a GL control file (Box 601), and a currency control file (Box 603) for the euro corps only remain.

While in the production region a production GL master file (Box 271), a production GL control file (Box 270) and a production currency control file (Box 272) for old corps only remain. Back up the test region, all GL VSAM files.

Figure 2B:
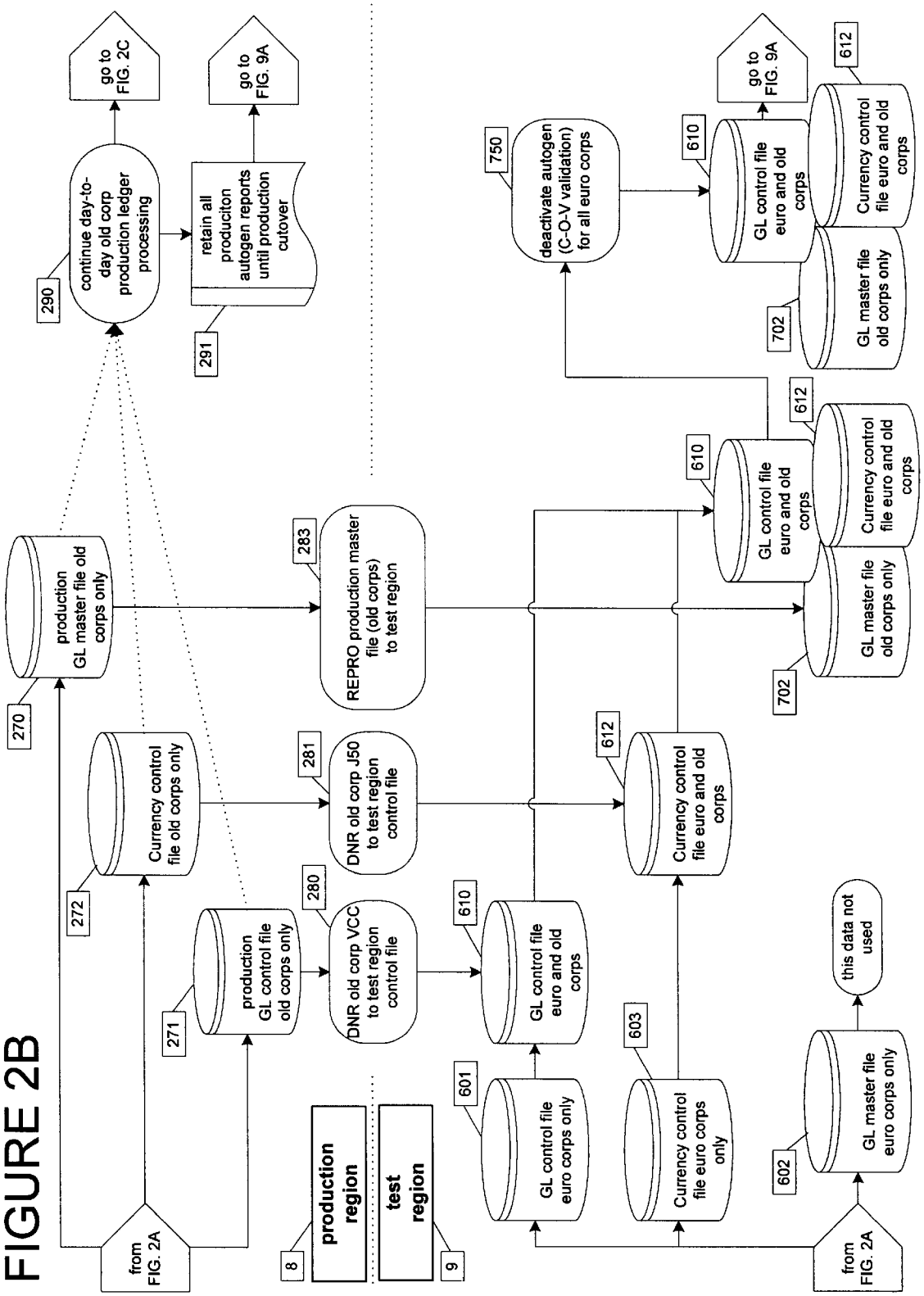

Referring to FIG. 2B, DNR old corp VCC (Box 280) and J50 (Box 281) from production region (Boxes 271 and 272) to the test region. This creates a combined GL control file (Box 610) for euro and old corps and a combined currency control file (Box 612) for euro and old corps. None of the old corps' control file records exist in the test region because of the corp move completed earlier. However, the upcoming master file conversion process depends on reading certain fields from the old corps while building the new corp's master file. The required fields are on the VCC (corp control) and J50 (corp currency options). Run DNR with an ID request of C01 EUROCRP to move new copies of those records to the test region.

In test, manually convert and update J50V3 transaction balancing limits for euro corps. Last record adjust and currency suspense amount limits are an optional component of the currency control file setup for any currency corp. The new euro corps inherited the limits from their corresponding old corps, expressed as units of the old currency. The limits are in effect through all fields. Back up the test region, all GL VSAM files.

Still referring to FIG. 2B, applying a IDCAMS REPRO (Box 283) to the production GL master file(Box 270) old corps only into the test region. This will overlay the existing master file in the test region with the production master file again (where all master file records point to the old corps) while leaving the control file corps (Box 610) set for the new euro corps. (After the corp move, all master file records pointed to the new euro corps but were useless as such.) The refreshed master file in the test region is the source for building new euro master file records and populating the amounts. Back up the test region, all GL VSAM files.

Still referring to FIG. 2B, day-to-day old corp production ledger processing (Box 290) continues. In the test region, turn off Autogen and combo checking for all euro corps (Box 750). Document each euro corp's VCC02 switch settings with screen pictures (screenpics) for the audit trail. For each euro corp, replace both switches with '0'. After production cutover, these will be replaced with their old values from the screenpics. This step allows the euro master file records to be created as virtual duplicates of the old corp's records despite possible revalidation (chart-of-values, or VCV) errors.

Procedure Definition Language 'EUROCOPY'

Figure 2C:
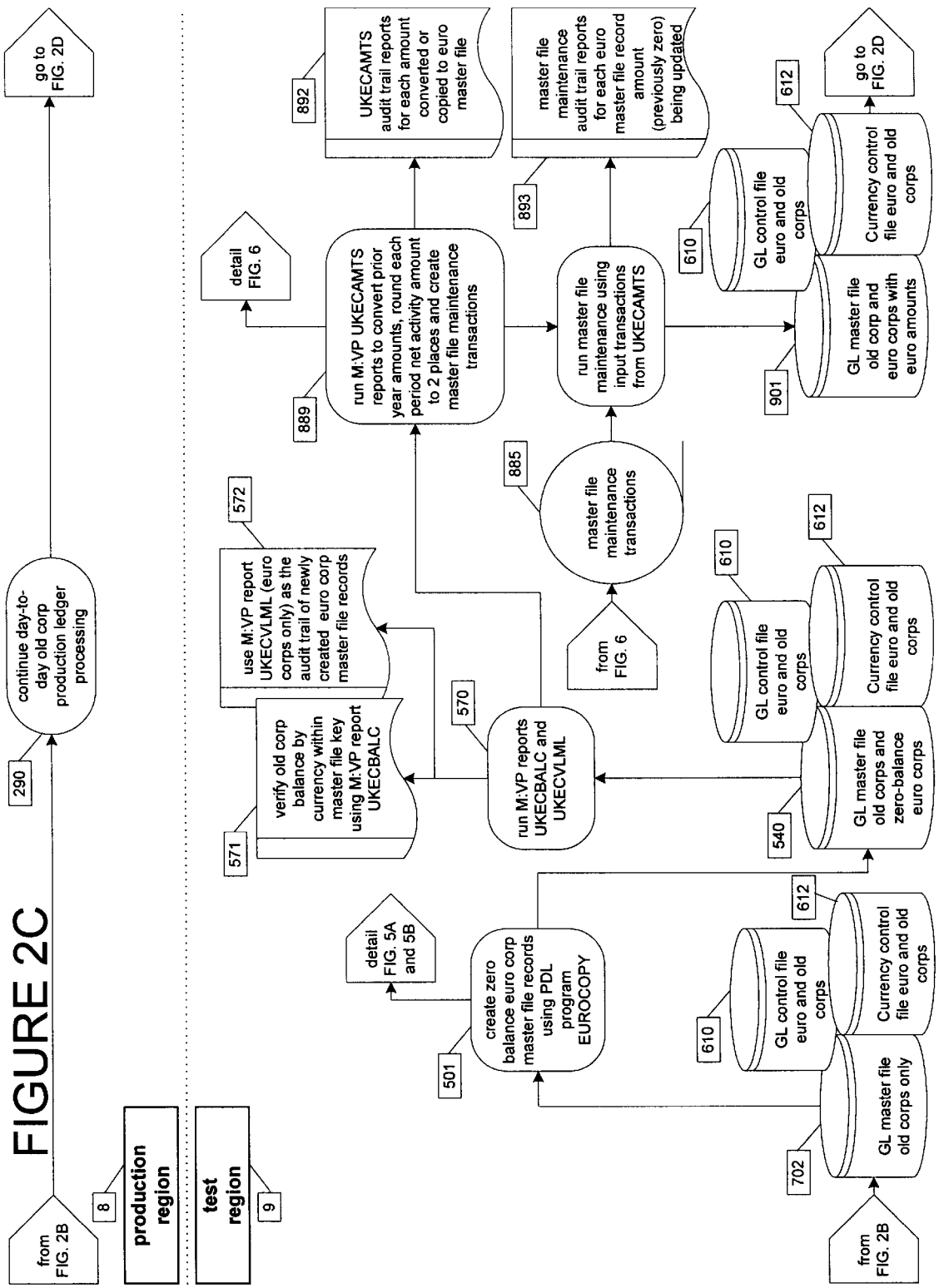

Referring to FIG. 2C, create euro master file records in the test region using the PDL program EUROCOPY (Box 501). EUROCOPY uses the master file records of the old corps to create corresponding master file records for the euro corps. Back up the test region, all GL VSAM files. After the above steps a GL master file old corps and zero-balance euro corps (Box 540), a GL control file euro and old corps (Box 610) and a currency control file euro and old corp (Box 612) remain.

In the test region, run M:VP cycle EUROBALC (Box 570) (run only against the old corps at this point) and verify that within one master file key, the total of the transaction equivalent records equals the book one total (Boxes 571). This verification is isolated to actuals and averages within the prior year.

Still referring to FIG. 2C, in the test region, run master file currency code audit trail report M:VP cycle EUROVLML (Box 572) lists the currency codes that exist within each master file key for both the old corps and the euro corps. The euro corps should not contain any participating currency records. These reports exist primarily as part of the conversion audit trail.

Still referring to FIG. 2C, in the test region, extract old corp amounts, convert as required, and update the euro master file using the M:VP cycle EUROAMTS (Box 889). All prior year amounts are migrated to the euro master file using the following criteria:

Non-participating currency transaction currency records (currency code 'xxx_', where 'xxx' is the currency code of a non-participating currency) and statistical accounts (type 'B' or 'V', balance or volume) are copied to the maintenance transaction as is, without amount conversion.

Non-participating currency equivalent records (currency code 'xxx1', where 'xxx' is the currency code of a non-participating currency) and book one records (currency code '1_') in the source corp are expressed in the old book currency (FRF in our example), and therefore need to be converted. The source amount is divided by the euro conversion rate, rounded to 2 places, and written to the maintenance transaction.

Participating currency transaction currency equivalent records (currency code 'xxx1', where 'xxx' is the currency code of a participating currency) are converted by dividing the amount by the euro conversion rate, rounding to 2 places, and adding the result to a running total for 'EUX?' as a euro transaction currency/bk1 equivalent amount. After all records have been processed for the master file key, its running total is written to an 'EUX?' maintenance transaction.

Participating currency transaction currency records (currency code 'xxx_' where 'xxx' is the currency code of a participating currency) are ignored. By definition, the number of transaction currency euros must equal the number of transaction currency equivalent euros because the booking currency of the corp is now euros. By using 'EUX? in the output maintenance transaction from the previous step, both the 'EUX_' and 'EUX1' records in the euro corp's master file will be updated with the same euro amount.

EUROAMTS uses master file records from the source corps to create an output file of master file amount maintenance transactions (V1W). Amount classes are extracted individually from the source corp record and written to a flat sequential file of master file amount maintenance transactions. Amounts are extracted by period, beginning with period 00 of the prior year. Master file maintenance then uses the V1W transactions to update the euro master file. Prior year actuals use report sequence 10 of the EUROAMTS cycle. Report sequence 20 converts averages for financial institution balance sheets.

Figure 6:
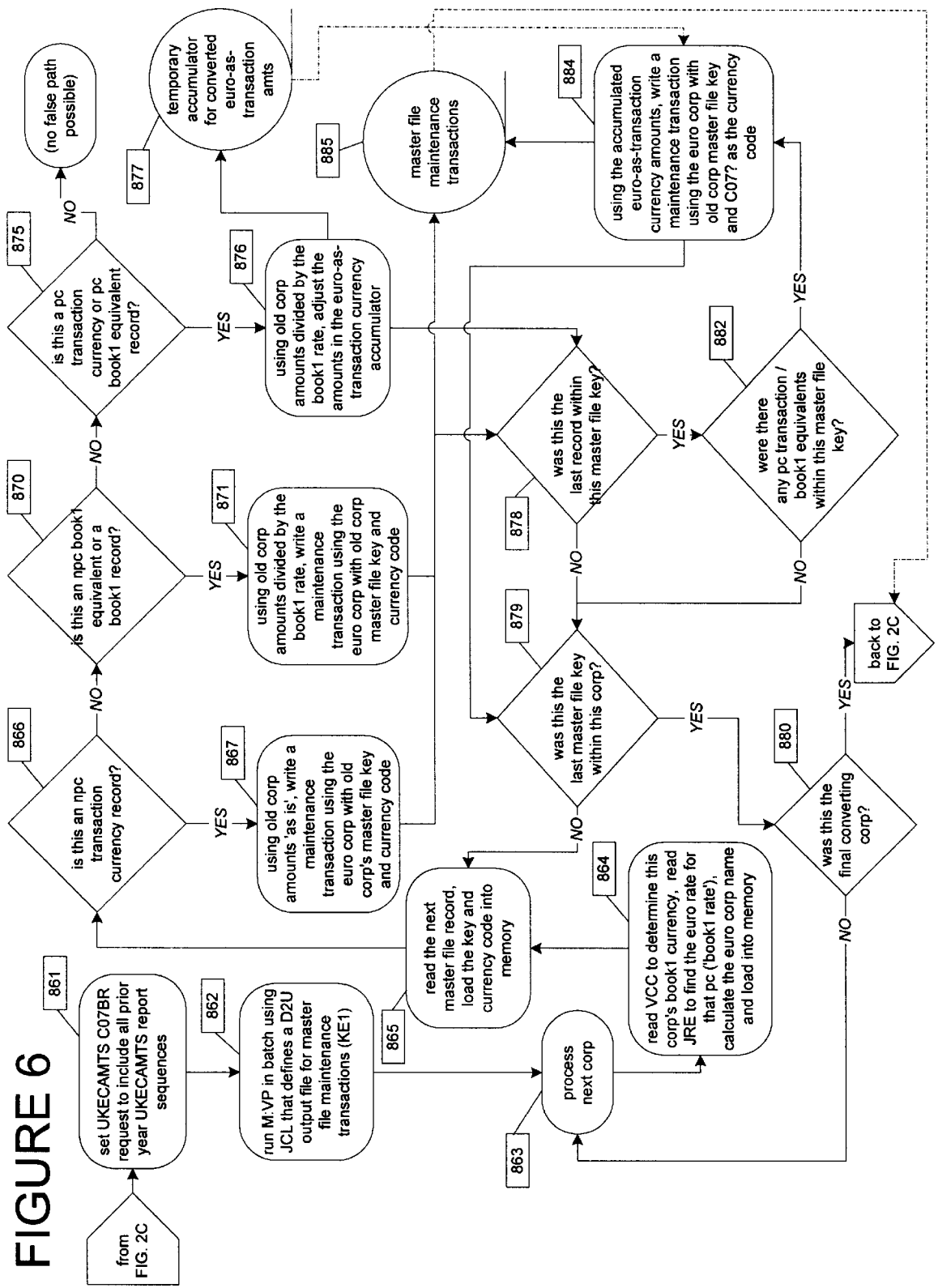
FIG. 6 is a flowchart showing the EUROAMTS program of FIG. 2C in greater detail.

Detail of the EUROAMTS cycle is described below and referred to in FIG. 6.

Still referring to FIG. 2C submit the master file maintenance job (Box 891) using input transactions from EUROAMTS (Box 885) to create a GL master file old corp and euro corp with euro amounts (Box 901), a GL control file euro and old corp (Box 610) and a currency control file euro and old corps (Box 612).

Intra Record Rounding Correction Using EURO2RND

Figure 2D:
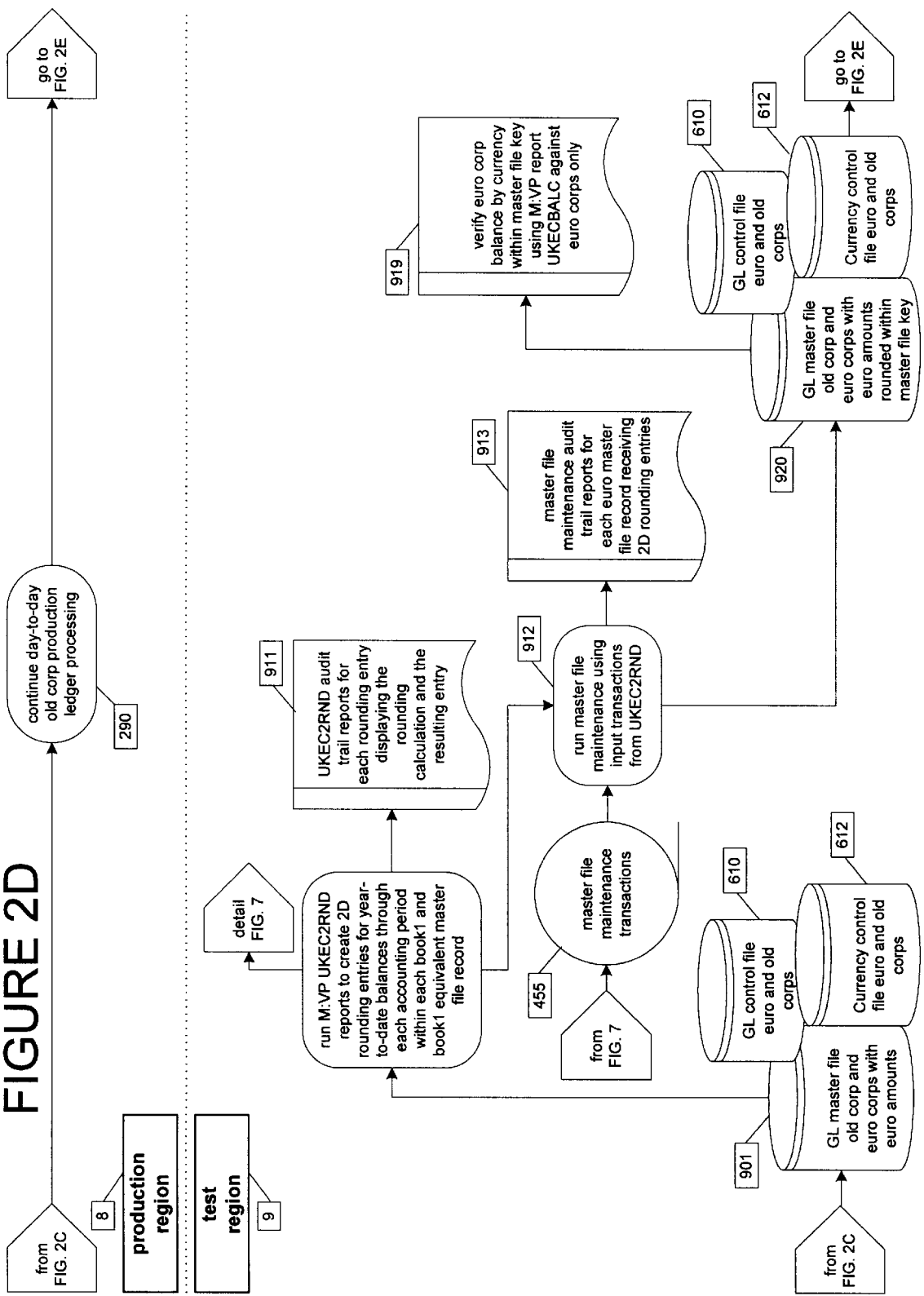
Figure 2F:
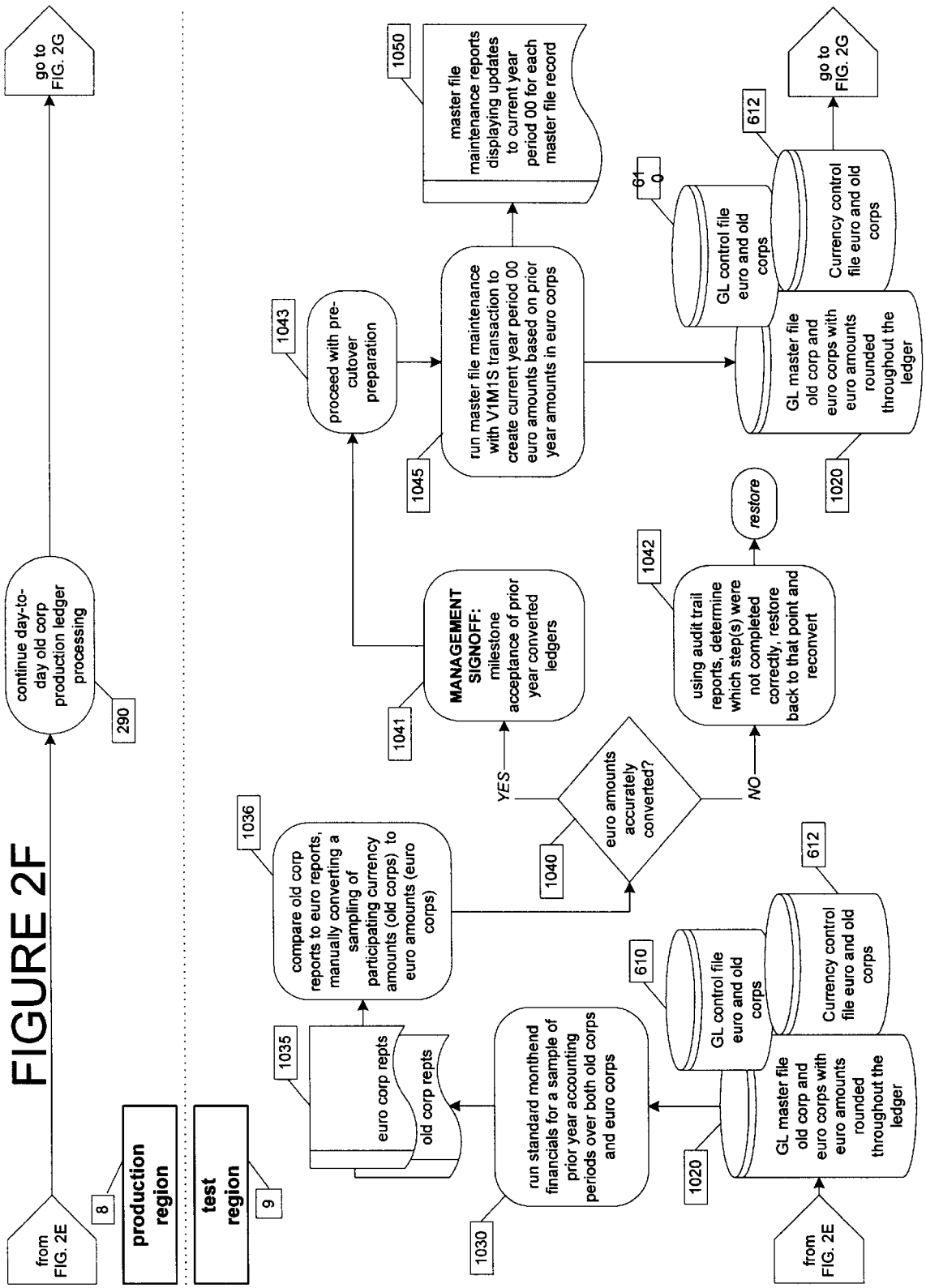

Referring to FIG. 2D in the test region, create and post YTD balance 2D rounding adjustment write-offs for prior year by applying the M:VP cycle EURO2RND (Box 910) to evaluate YTD balance rounding errors by comparing YTD balances in the euro corp against YTD balances from the old corp (converted to euros 'on the fly' during report execution). If one or more rounding errors are found within one master file key, the report creates a master file maintenance transaction (Box 455) with the correcting entries.

EURO2RND reports create an audit trail (Box 911) of old-to-new rounding comparisons for every book one record, every non-participating book one equivalent master file record, and participating book one equivalents grouped and compared to the corresponding EUX1 record. In the book one and non-participating currency sequences, a message displays if there are no errors for any periods within one key. Because the nature of the comparison prevents selective line printing, the 2D rounding report for participating currency book one equivalents prints all periods regardless of whether rounding adjustments are required. For each period/amount class/master file key requiring a 2D rounding entry, the audit trail report displays the source corp YTD balance in participating currency, the conversion rate (in the header), the euros resulting from 'on the fly' conversion of the old corp balance, the YTD balance in the euro corp, and the amount of the rounding difference. As with other reports, this output must be preserved as part of the euro conversion audit trail.

The rounding entry maintenance transactions (Box 455) resulting from sequences 10 and 20 use '1_' (the book one record) as their currency code. The maintenance transactions from sequences 15 and 25 use the currency code of the non-participating-currency to which the maintenance applies. Sequences 17 and 27 use 'EUX?' as the currency code of the maintenance transactions regardless of how many old corp currencies were included in the comparison.

Run master file maintenance using input transactions from EURO2RND (Box 912) to create master file maintenance audit trail report (Box 913) for each euro master file record receiving 2D entries. After the above steps a GL Master file old corp and euro corps with euro amounts rounded within master file key (Box 920), a GL control file euro and old corps (Box 610) and a currency control file euro and old corp (Box 612) remain.

In test, test euro corp currency balancing within key for the prior year by running the M:VP cycle EUROBALC (Box 919) again, this time only against the euro corps. Again, it verifies that within one master file key, the total of the transaction equivalent records equals the book one total. Exceptions other than small rounding errors must correlate with out-of-currency-balance exceptions from the original run of this report cycle.

Although each book one record, EUR1 (euro as transaction currency) equivalent, and non-participating currency book one equivalent is now accurately rounded, the group of records within one master file key is still subject to an accumulation of rounding errors. Although it is manifested in a different context, this is the same basic rounding issue to which the 2D rounding entries were the solution. However, in this context is there is no logical target for the balancing entries—to book the rounding error to any of the three record types would put it out of YTD (2D) rounding accuracy.

The scope of this rounding issue is microscopic. During testing over large volumes of realistic data, newly out-of-currency-balance keys comprise less than ½ of 1% of the converted master file keys.

Based on management discretion, there are three possible solutions for these final and unavoidable rounding errors. First, these rounding differences could be ignored. Second, amount maintenance could be performed to a non-participating book one equivalent, causing the rounding error to reflect in the following month's revaluation of that currency within that key. Finally, M:VP reports that test currency balance within key could test against a tolerance, ignoring imbalance conditions under, say, 5 euro cents. All errors found during testing were 2 euro cents or less. No 'writeoff' account is used at this point in the conversion process because the net total of rounding entries is irrelevant.

Intra Ledger Rounding Errors Correction Using EURO3RND

Referring to FIG. 2E a rounding step for the 3D rounding process, which balances each corp, by period, at reporting levels is executed. By definition, the net total of entries created in the 2D process will be reflected in those 3D rounding entries, which then net to a 'writeoff' account. One conversion year is rounded by a group of six report sequences. (L1 actuals and averages are rounded by sequences 10, 15, & 17 and 20, 25, & 27 respectively). You can choose to run any subset of these reports alone, or run them as a group. Running them as a group will save time. Running them individually makes it easier to audit one transaction through the entire process, although the full audit trail is produced regardless of which processing method you choose.

In the test region, create 3D rounding adjustment entries for prior year by running M:VP EURO3RND (Box 930) to determine 3D rounding entries for year-to-date balances through each accounting period within each high level reporting subtotal by account type. This semi-automated process corrects accumulations of rounding errors across many master file records that comprise a reporting subtotal (Box 1000) (for example, NET BALANCE SHEET, NET INCOME STATEMENT, and the CORP NET BALANCE of 0.00) as opposed to the automated process that corrected accumulations of rounding errors within one master file key. Where the automated rounding process earlier corrected 2nd dimension rounding across a single record, this task might be viewed as correcting rounding in the 3rd dimension of the converted ledger, down through many accounting keys.

Accumulations of rounding errors are evaluated for actuals only. Averages do not require 3D rounding, and budgets are discretionary by nature and were converted to even hundreds of euros anyway. When this process is complete, there will be unavoidable rounding errors one level below the level for which every subtotal is accurate to the euro cent. Suppose, for example, that we convert each participating currency subtotal on a summarized ledger to its euro equivalent. It is possible for the corp to be in balance, and for accurately rounded NET INCOME STATEMENT to equal NET BALANCE SHEET, with TOTAL ASSETS, TOTAL REVENUE, and TOTAL EXPENSES accurate to the penny, while TOTAL LIABILITIES remains out of balance by EUR0.01.

Still referring to FIG. 2E, enter 3D rounding errors to 3RNDL1.xls spreadsheet (Box 1010) and under user discretion where final 0.01 errors will reside (Box 1011). Upload rounding 3D entries (Box 1015) to mainframe as masterfile maintenance transaction using PCLINK grid. Run master file maintenance (Box 1016) to update euro master file with 3D rounding entry maintenance transactions. This creates master file maintenance audit trail reports (Box 1017) for each euro master file record receiving 3D rounding entries.

A GL master file old and euro corps with euro amounts rounded throughout the ledger (Box 1020), a GL control file euro and old corps (Box 610) and a currency control file euro and old corp (Box 612) remain.

Run EURO3RND verification sequences (Box 1025) against each euro corp to verify that NET BALANCES SHEETS equals NET INCOME STATEMENT and that CORP NET BALANCE is 0.00.

Referring to FIG. 2A, run standard monthend financials (Box 1030) for a sample of prior year accounting period over both old corps and euro corps which creates old and euro corp reports (Box 1035).

Compare old corp reports to the euro reports (Box 1036), manually converting a sampling of participating currency amounts to euro amounts. Determine whether the euro amounts were accurately converted (Box 1040) by running and manually checking the standard monthend financials for L1 year end, including a trial balance. Run identical groups of production financials against the old corps and the euro corps. The net balance for either corp on any report (if it is displayed) should be zero. As you drill down from net balance, manually converting random subtotals from the old corp should result in materially equivalent euro amounts in the euro corp report (although, as is known from step 30, immaterial rounding differences may still exist at low level subtotals in any euro report).

Note that reports for old corps must all be run in production—all control file specs, including report specs, were moved to the euro corps in the test region. Also, the VCC03 reporting column must be identical between source corps and their corresponding euro corps when these reports are run. The VCC03 for all corps should be set to period 12 of the prior year.

At Milestone signoff (Box 1041), the stage of the conversion process represents a milestone at which users' European management must accept the converted amounts for the prior year euro conversions and grant approval to proceed with the CY and F1 production cutover (Box 1043). Back up the test region, all GL VSAM files.

Continuing in the test region, update euro corp CY period 00 (Box 1045) by running the master file maintenance with a V1M1S transaction to populate period 00 of the current year with beginning balance sheet balances for each corp. This creates a master file maintenance report (Box 1050). Do not run any other maintenance transactions other than V1M1S during this run of master file maintenance.

Figure 2G:
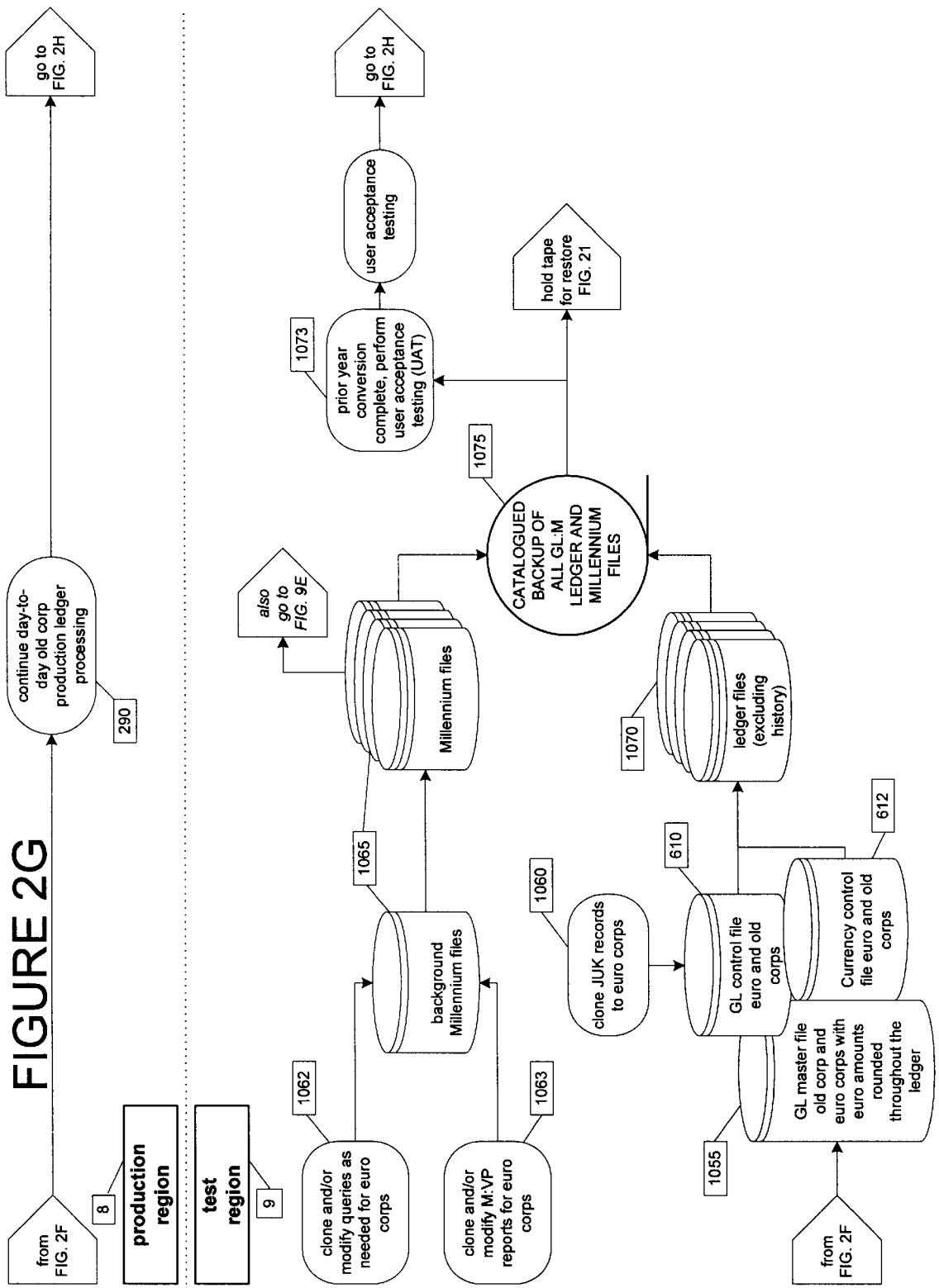

Referring to FIG. 2G, clone queries (if necessary) (Boxes 1062 and 1063) into new queries that recognize the new euro corp setup. The existing queries are cloned rather than replaced in order to preserve existing query capability against the old corps. Consider using 'EURO' in the first four bytes of the QUERY NAME for each cloned query to make them easily identifiable. This creates background Millennium files (Box 1065).

In test, manually convert euro corp repeating journals. Repeating journals are established once on a repeating journal currency screen VRJC1, then automatically released every time the corp's current period changes on the VCC03. All repeating journals from the old corps were copied to the new euro corps with their amounts still expressed in participating currency.

To calculate the new amount, divide the old participating amount by its euro rate (from the JRE) and round the result to 2 decimal places. Perform a replace on each VRJ with the new euro amount in amount 3.

If the repeater is an amortization of some kind, determine whether any change needs to be made to the amount during the last (or other) period(s) to prevent an accumulation of rounding errors from causing the total to be materially different than the old participating currency total. If the repeater represents a standard repeating entry (for example, a monthly expense accrual) the rounding impact might be irrelevant.

In the test region, clone user-developed custom data base identifications ("DBID's") (Box 1060) to the new euro corps. Review your general ledger control file to determine if there are any user-defined DBIDs holding records that must be moved for your euro corps. The corp move performed earlier does not move custom databases. It only moves records for databases within the original product as shipped by Geac. This will create ledger files that exclude history (Box 1070) and when combined with millennium files (Box 1065) a catalogued backup (Box 1075) of all GL:M ledger and millennium files remains for reasoning.

Evaluate M:VP reports to determine the impact from euro corps. Being a generic Millennium report writer, many M:VP reports will continue to work unchanged. However, consider the following;

Reports that read in journal history records (VJH) will show no activity for the euro corps until at least one post has been run in production over those corps. Euro corps will accumulate their own history records over a period of time.

Back up the test region GL files and all Millennium files (including M:VP and query files) and catalogue the tape.

Figure 2H:
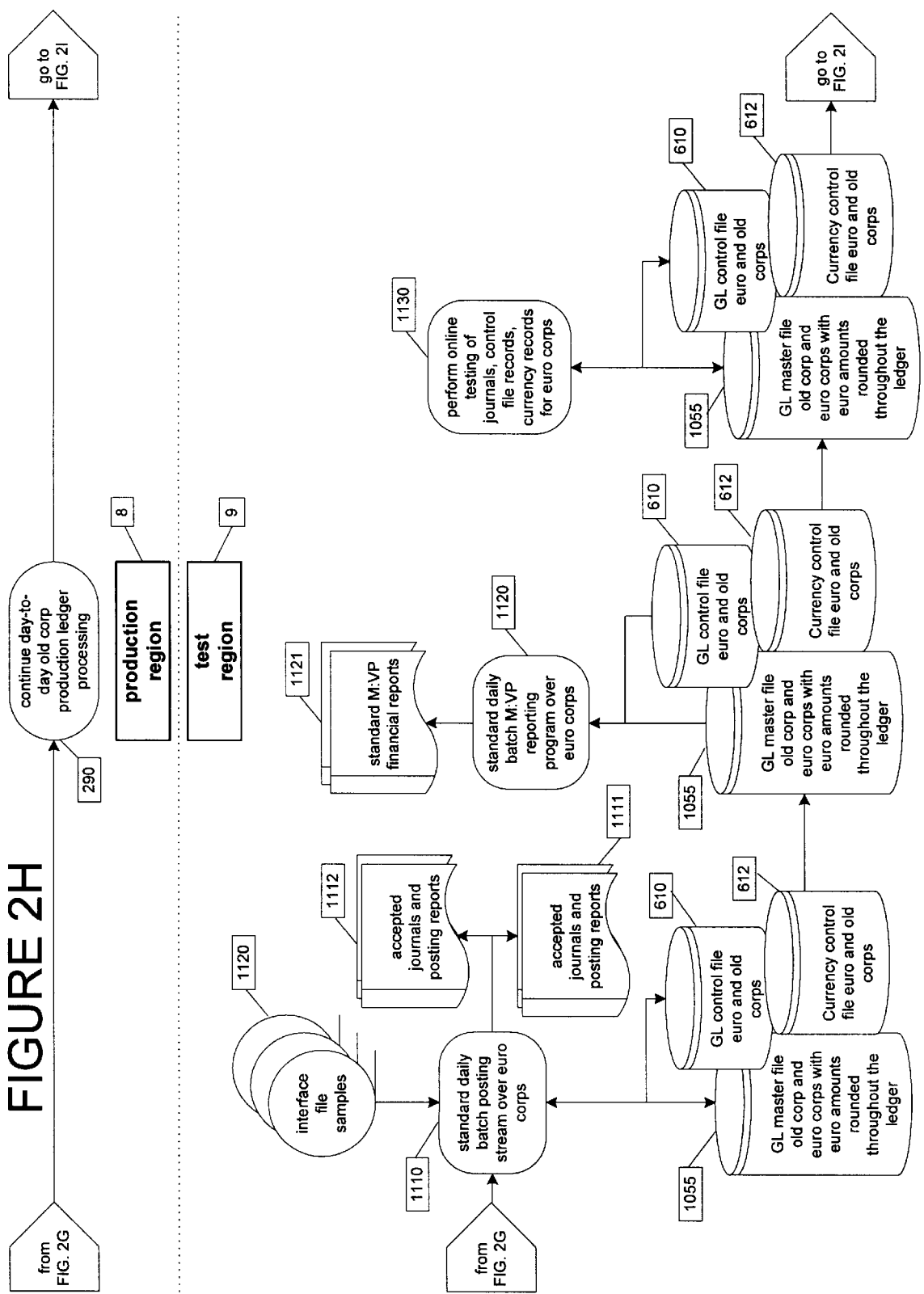

Referring to FIG. 2H, during pre-cutover preparation, in the test region, batch post (Box 1110) the sample interface files (Box 1120). Using the sample datasets supplied by feeder system owners containing the euro corp IDs, perform batch posts to the new euro corps and verify the results (Boxes 1111 and 1112) Because there aren't any amounts in the euro corp current year at all except period 00, some report amounts (for example the 350/351 reports) will look odd. For this reason, evaluate the interfaces for correct euro corp IDs, proper currency conversion, any entry creation that is performed, and that they appear correctly on system reports such as the accepted journals report. At this point, disregard full balance sheet or P&L current year reports.

Execute DRW report (Box 1120) with the VCC03 reporting date set to the prior year, identical DRW report cycles can be run against old and euro corps. Dividing any amount in an old corp report by its euro rate should yield materially the same amount on the corresponding euro report (Box 1121).

Execute M:VP report (Box 1120) with the VCC03 reporting dates still set to the prior year, the same process used to verify DRW reports can be used to verify M:VP reports (Box 1121). The same criteria about L1 (which are really L2) amounts apply.

Perform online testing (Box 1130) by executing online testing (journals, queries, etc.) to whatever level is required for your current internal audit certification.

Test non-interface batch (Boxes 1140, 1141, 1142, 1143, 1145, 1150 and 152) with allocations and monthly currency revaluation as examples of batch programs that are probably used regularly in production, but require no special conversion effort. Identify which programs of this type you use, and test them now.

At this point user acceptance testing (Box 1100) begins and the pre-cutover preparation for euro conversion is complete.

Production Cutover

Figure 9A:
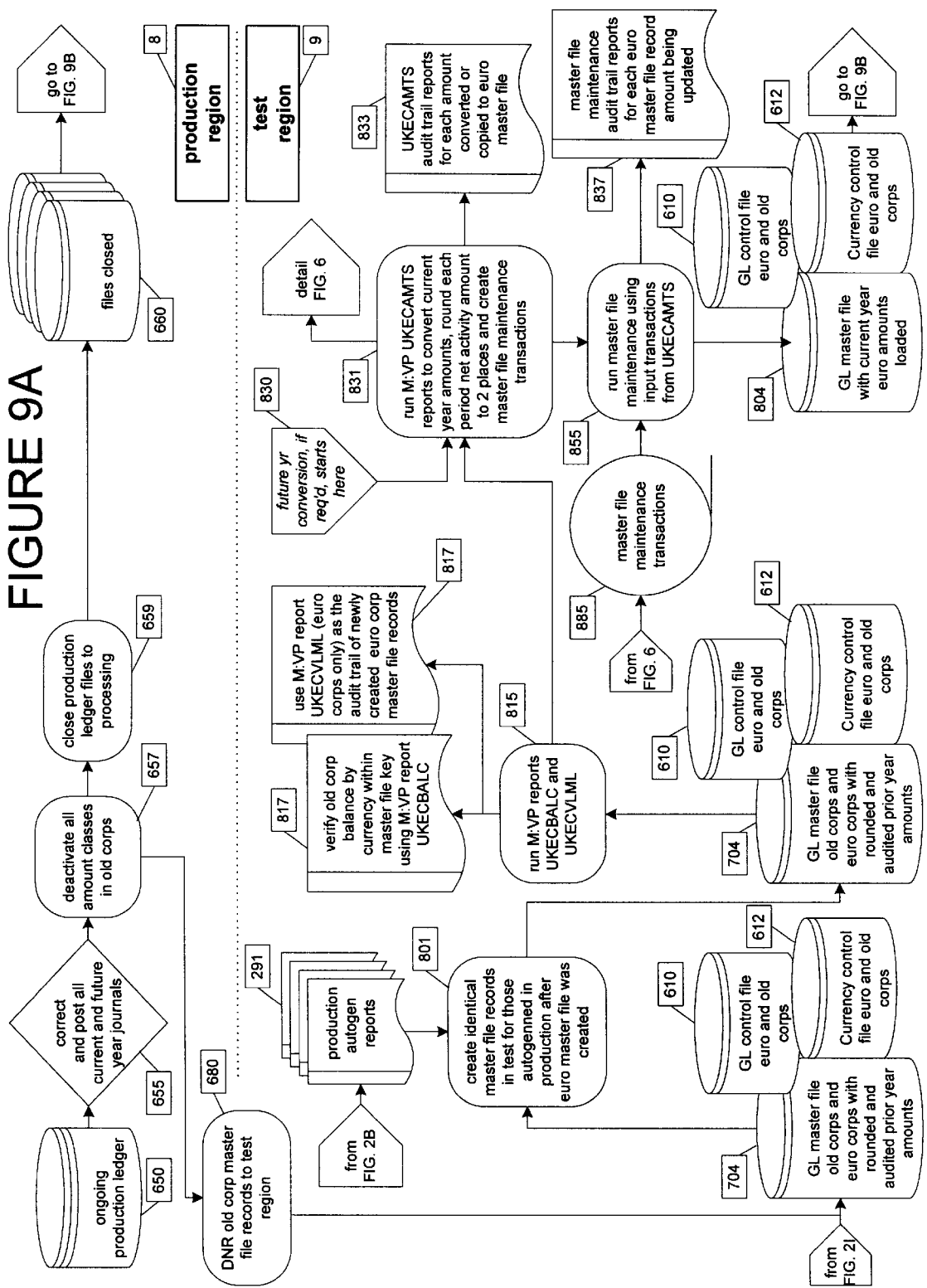
FIGS. 9A–9F are flowcharts showing during production cutover of FIG. 1 in greater detail.

Referring to FIG. 9A, during production cutover in the production region, correct and post (or delete) all unposted journals (Box 655). Use a query or report find all unposted journals regardless of effective date. The journal posting stream will not be run against the old corps again after this step. All unposted current- and future-year journals must be posted or deleted.

All unposted prior-year journals should have been deleted during the pre-cutover preparation. If any unposted prior-year journals are found now, they must be evaluated to determine whether or not they should be manually entered to the corresponding euro corp as a prior-year journal. In any case, they must be deleted from the old corps without being posted.

For unposted current- and future-year journals; If a standard online journal is found that must be posted, correct any errors and batch post the journal using normal procedures. If a standard online journal is found that should not be posted, use the DEL command from the journal control screen VJC01 to delete its header and all associated journal lines.

If a suspense reversal journal is found, determine whether the journal must still be posted to balance the suspense account with the reversing entry. If a different journal was entered to balance the suspense account, delete the unposted suspense reversal. If there was no replacement for the unposted journal, you must correct the journal to balance the suspense account. After making the necessary corrections, batch post the journal using normal procedures. If a batch recycle journal is found that must be posted, make the necessary corrections on the batch recycle screens VCE01 and/or VDE01 and batch post the journal using normal procedures.

If a batch recycle journal is found that should not be posted, replace the VCE01 with an UPDATE field value of 'D', and the batch recycle journal will be deleted during the batch post.

If one or more of the above scenarios includes the requirement for a batch post to be run, execute it now. If, after the post, journals that were expected to post are still in online recycle, suspense, or batch recycle, correct them and rerun the post until all journals are posted.

Back up production GL files using the standard production backup routine.

In production, set all old corp amount class ACTIVITY STATUS switches to '4'. This deactivates them (Box 657), preventing all further activity of any kind (Box 659) (journals, master file maintenance) while leaving the master file open to reporting and query. The files remain closed in the production region for the remainder of the production cutover(Box 660).

Use Millennium DNR (Box 680) to copy old corps' production master file records to the test region. Run the DNR dump using production files, and then the DNR ADD to the test region. The ADD mode will delete any master file records it finds that match one of the C01 startkeys, and insert every master file record from the production dump.

This creates GL master file old corps and euro corps with rounded and audited prior year amounts (Box 704), combined with a GL control file euro and old corps (Box 610), and a currency control file euro and old corps (Box 612).

In test, create euro master file records (Box 801) for recently Autogenned (or manually created) production records (Box 291). Using either the set of production Autogen reports accumulated since the pre-cutover process or the list of manually created records, create a record in test for the corresponding euro corp, using the same master file key and currency code.

When a master file key receives an entry in a currency that has never been used for that key before, the transaction currency record and book one equivalent records are always Autogenned as a pair. They are included in the Autogen report issued by the next batch posting job.

If a transaction currency/equivalent pair for any participating currency displays on an Autogen report, you must check the euro corp's master file list screen (VLMLS) to see whether a corresponding pair using 'EUX' and 'ELUX1' already exists in the euro corp. If the 'EUX'/'EUX1' pair already exists for that key in the euro corp, you can ignore that key and continue with the next key in the Autogen report.

If the 'EUX'/'EUX1' pair does not exist in the corresponding euro corp master file, the participating currency pair on the Autogen report is the first participating currency activity for this master file key. The pair must be inserted to the euro corp master file using 'EUX_' and 'EUX1' currency codes, regardless of which of the participating currency codes appears on the Autogen report.

If book one records or non-participating currency pairs appear on the Autogen report, they must be inserted to the euro corp master file using the same currency code(s) displayed on the Autogen reports.

Retain the Autogen reports that were used to insert these records. They are source documents for the audit trail In test, rerun master file currency code audit trail reports (Box 815)against the euro corps. The previous task changed the master file records for the euro corps that had previously been documented by M:VP cycle EUROVLML (a simple listing of the currency codes that exist within each master file key for each corp). Rerun the report for the euro corps. As was the case when this report was run during pre-cutover preparation, the euro corps should not contain any participating currency records. Save these reports as part of the conversion audit trail (Boxes 817 and 819). Back up the test region, all GL VSAM files.

In test, convert CY amounts to euros and update euro master file records (Box 831). This is similar to the amount conversion in the pre-cutover preparation phase, except the amounts being converted are current year instead of prior year. All corp VCC03 reporting columns should be set to period 12 of the current year.

For the budgets use Cycle 50 of ELTROAMTS (Box 833) to create maintenance transactions for the CYB01 amount class. Prior year budgets were not converted.

For future periods, accrual reversals and future period journals (in the current year) are two examples of activity that updated periods beyond the current period in production. For that reason, allow the report to run the way it is built—to evaluate every period of the current year, regardless of which is the current period. The report only produces output amounts if they are needed. Future periods with zeroes in the old corp will have zeroes in the euro corp after this process is complete.

All CY amounts are migrated to the euro master file using the same criteria applied to prior-year amounts;

Non-participating currency transaction currency records (currency code 'xxx_', where 'xxx' is the currency code of a non-participating currency) and statistical accounts (type 'B' or 'V', balance or volume) are copied to the maintenance transaction as is, without amount conversion.

Non-participating currency equivalent records (currency code 'xxx1', where 'xxx' is the currency code of a non-participating currency) and book one records (currency code '1_') in the source corp are expressed in the old book currency (FRF in our example), and therefore need to be converted. The source amount is divided by the euro conversion rate, rounded to 2 places, and written to the maintenance transaction.

Participating currency transaction currency equivalent records (currency code 'xxx1', where 'xxx' is the currency code of a participating currency) are converted by dividing the amount by the euro conversion rate, rounding to 2 places, and adding the result to a running total for 'EUX?' as a euro transaction currency/bk1 equivalent amount. After all records have been processed for the master file key, its running total is written to an 'EUX?' maintenance transaction.

Participating currency transaction currency records (currency code 'xxx_', where 'xxx' is the currency code of a participating currency) are ignored. By definition, the number of transaction currency euros must equal the number of transaction currency equivalent euros because the booking currency of the corp is now euros. By using 'EUX? in the output maintenance transaction from the previous step, both the 'EUX' and 'EUX_1' records in the euro corp's master file will be updated with the same euro amount.

There are multiple sequences within the EUROAMTS cycle(Box 835). When processing these sequences, the combined output can be processed during one execution of master file maintenance (Box 885) to increase efficiency. If you want to run the sequences individually, set the EUROAMTS C07BR request card process sequence at 30, execute the M:VP job, then run master file maintenance with the M:VP output as batch maintenance transactions. Then replace the C07BR with a sequence 40, execute the M:VP job, run maintenance again. Finally, replace the C07BR with a sequence 50, execute the M:VP job, and run maintenance one final time. Run this report using M:VP JCL that includes a D2U output file definition for master file maintenance transactions.

After the above steps, a GL master file with current year euro amounts (Box 840), is combined with a GL control file euro and old corps (Box 610), and a currency control file euro and old corps (Box 612).

Figure 9B:
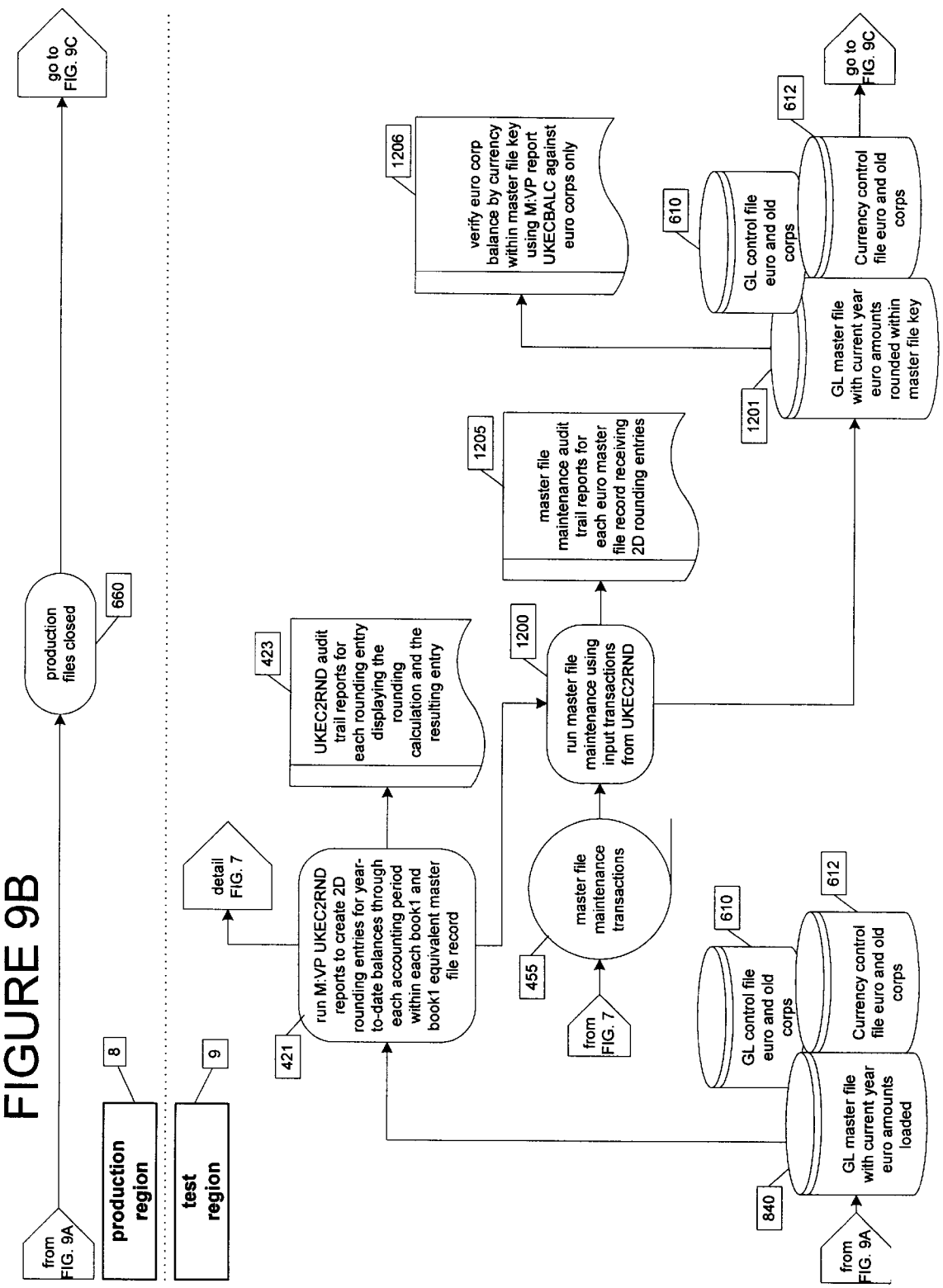

Referring to FIG. 9B in the test region, create current year rounding adjustments and post to euro corps (Box 421). The rounding entries being created are for each period of the current year.

Allow the reports (Box 423) to evaluate rounding for all periods of the current year (all the way through to period 15) regardless of what the current period is, and regardless of whether there is a future period with no activity. If balances were only rounded through the current period, future periods that do have converted amounts in them (for example, from accrual reversals or future period activity) could cause YTD balances to be out-of-balance when that period becomes the current period. If there is a future period that happens to have no converted activity whatsoever, the program will compare zeroes to zeroes and not create any rounding entries.

M:VP cycle EURO2RND (Box 421) sequences 30 through 47 evaluate current year YTD balance rounding errors by comparing YTD balances in the euro corp against YTD balances from the old corp (converted to euros 'on the fly' during report execution). When rounding errors are found, the report creates master file maintenance transactions (Box 455) to correct them. Leave the VCC03 reporting column set to period 12 of the current year for all corps.

Ensure that all old corps' and euro corps' VCC03 reporting columns are set to period 12 of the current year when running this report.

The maximum possible rounding error for one period/amount class/master file key is EUR0.01. If rounding entries for more than 0.01 are generated, an error has occurred during the conversion process. That error must be found and corrected before proceeding with this step.

Book one records and every non-participating book one equivalent master file record are compared to the corresponding records in the euro master file. Participating book one equivalents are grouped and compared to the corresponding EUX1 record. In the book one and non-participating currency sequences, a message displays if there are no errors for any periods within one key. Because the nature of the comparison prevents selective line printing, the 2D rounding report for participating currency book one equivalents prints all periods regardless of whether rounding adjustments are required. For each period/amount class/master file key requiring a 2D rounding entry, the audit trail report displays the source corp YTD balance in participating currency, the conversion rate (in the header), the euros resulting from 'on the fly' conversion of the old corp balance, the YTD balance in the euro corp, and the amount of the rounding difference. As with other reports, this output must be preserved as part of the euro conversion audit trail.

The rounding entry maintenance transactions resulting from two sequences use '1\_\_' (the book one record) as their currency code(Box 1200). The maintenance transactions from another two sequences use the currency code of the non-participating-currency book one equivalent to which the maintenance applies. Yet another two sequences use 'EUX?' as the currency code of the maintenance transactions regardless of how many source corp currencies were included in the comparison (Box 1205).

The 'writeoff' account is not used at this point in the conversion process because the net total of rounding entries is irrelevant. The next rounding step will be a 3D rounding process, which balances each corp, by period, at reporting levels. By definition, the net total of entries created in this 2D process will be reflected in those 3D rounding entries, which then net to a 'writeoff' account.

One conversion year is rounded by a group of six report sequences. You can choose to run any subset of these reports alone, or run them as a group. Running them as a group is more efficient. Running them individually makes it easier to audit one transaction through the entire process, although the full audit trail is produced regardless of which processing method you choose.

After the above steps, a GL Master file with current year amounts rounded within the same master file key (Box 1201) are combined with a GL control file euro and old corps (Box 610), and a currency control file euro and old corps (Box 612).

Still referring to FIG. 9B in the test region test, verify euro corp currency balancing within key for the current year. Run the M:VP cycle EUROBALC (Box 1205) again, except this time only against the euro corps. Again, it verifies that within one master file key, the total of the transaction equivalent records equals the book one total. Exceptions must correlate with out-of-currency-balance exceptions from the old corps. This report will be a reference while working on the next step. All VCC03 reporting dates remain in the current year.

After CY 2D rounding is complete, the ledger still has the potential to have a small number of out-of-currency-balance master file keys. Although each book one record, EUX1 (euro as transaction currency) equivalent, and non-participating currency book one equivalent is now accurately rounded, the group of records within one master file key is still subject to an accumulation of rounding errors. Although it is manifested in a different context, this is the same basic rounding issue to which the 2D rounding entries were the solution. However, in this context is there is no logical target for the balancing entries—to book the rounding error to any of the three record types would put it out of YTD (2D) rounding accuracy.

Refer to the working papers from pre-cutover preparation to determine which of three possible solutions were chosen. The three solutions were that the condition could be ignored, amount maintenance could be performed to a non-participating book one equivalent, or M:VP reports that test currency balance within key could test against a tolerance, ignoring imbalance conditions under, say, 5 euro cents.

Figure 9C:
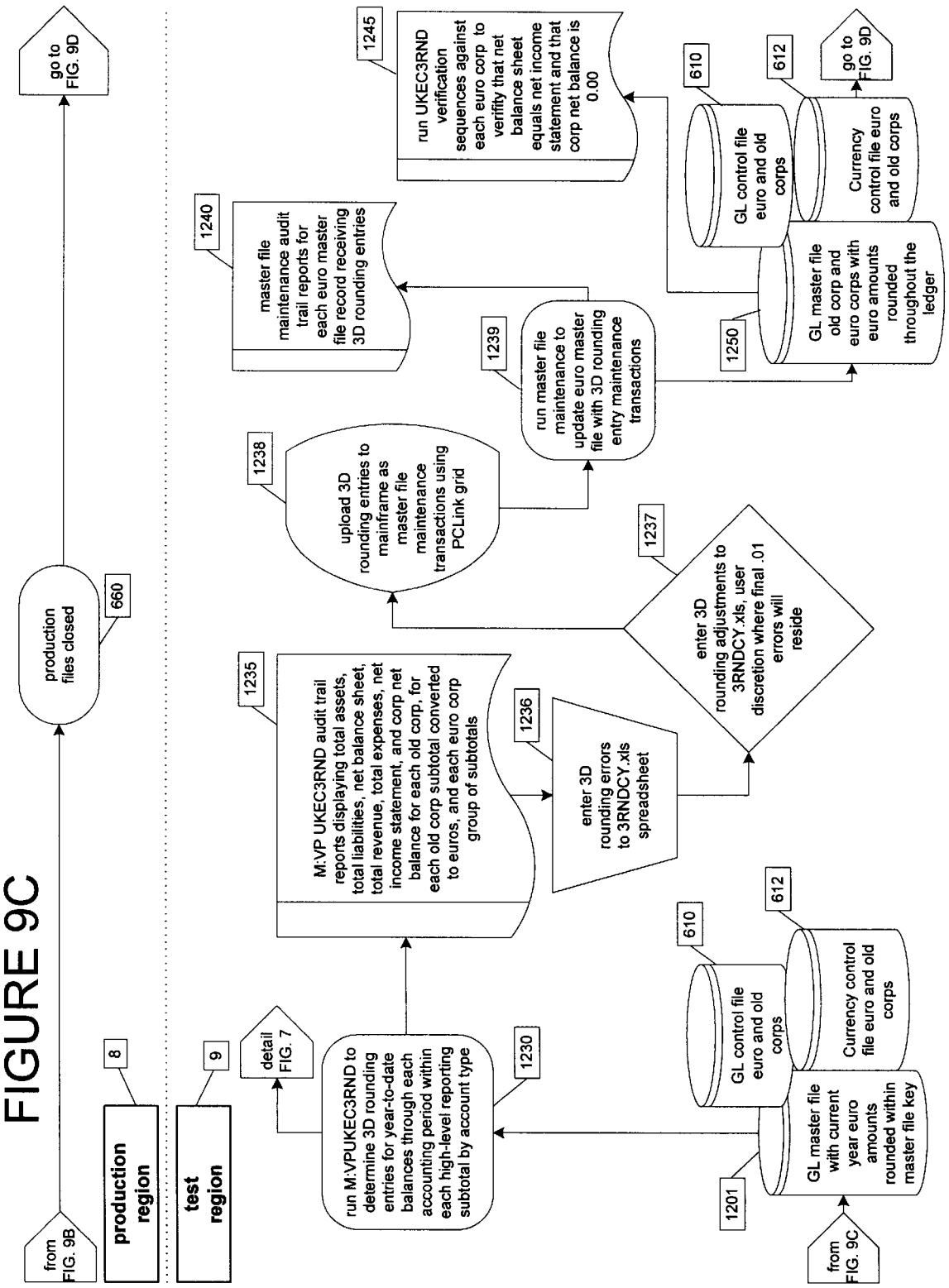

Referring to FIG. 9C, in the test region, create 3D rounding adjustment entries for CY by running M:VP EURO3RND (Box 1230). This semi-automated process corrects 3D rounding errors, which are accumulations of rounding errors across many master file records that comprise a reporting subtotal (Box 1235) (for example, NET BALANCE SHEET, NET INCOME STATEMENT, and CORP NET BALANCE) as opposed to the automated process that corrected accumulations of rounding errors within one master file key.

The same group of 3D reports that was used for prior year conversion is used for current year conversion. The reports use dynamic formulas that need no maintenance other than the corp reporting dates to resolve properly. For both old and euro corps, all VCC03 reporting column dates must remain set to the current year, period 12.

Enter 3D rounding errors into the Excel spreadsheet called 3RNDCY.XLS (Box 1236). Use with PCLink 3.2 (Box 1238) to upload all 3000 or so entries for the current conversion year to the V1M1W master file maintenance transaction (Box 1239) screen at one time.

There is one additional component to 3D rounding that only applies when you are creating the rounding entries for the most recently closed production period. You must manually round the A/R and A/P balance sheet accounts to preserve reconciliations before making other rounding adjustments at the TOTAL ASSETS and TOTAL LIABILITIES levels.

Using the manual reconciliation documents from the just-completed production period close, ensure that the reconciliation process produces the same results when performed against the euro corp ledger and the euro A/P and A/R processing corps.

It is impossible to predict where adjustments might need to be made. However, any adjustments made to the balance sheet will impact the current period rounding entries at the NET BALANCE SHEET level, so they should be entered before performing the 'standard' 3D rounding process in this task for the most recently closed period.

If information is not available from A/P and A/R to create those rounding entries, another alternative would be to ignore them for now and continue with the production cutover plan. However, when rounding entries are finally made to ledger A/R and A/P balance sheet accounts, they will impact each following period. 3D rounding entries must be made from the conversion period forward at that time to ensure balanced ledgers through the rest of the year.

After the above steps a GL master file old corp and euro corps with euro amounts rounded throughout the ledger (Box 1250), is combined with a GL control file euro and old corps (Box 610), and a currency control file euro and old corps (Box 612).

Figure 9D:
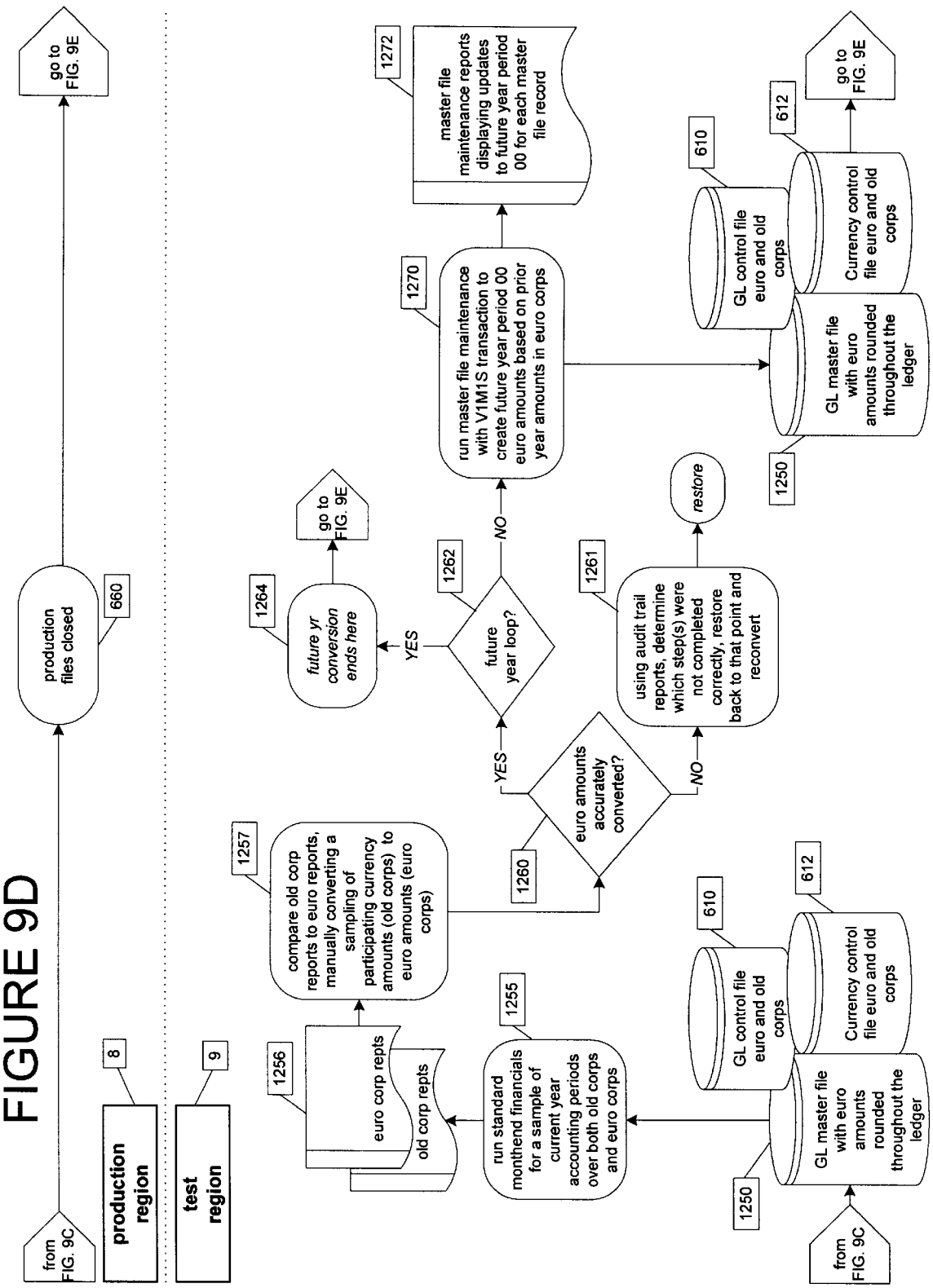

Referring to FIG. 9D, run and manually check the standard monthend financials (Box 1255) for CY year end. Run identical groups of production financials against the old corps, and the euro corps in test to create euro corp and old corp reports (Box 1256)

Compare old corp reports (Box 1257) to the euro reports and the net balance (if displayed) on any report should be zero. As you drill down from net balance, manually converting a subtotal from the old corp should be materially equal to the corresponding subtotal on the euro corp report.

Note that the VCC03 reporting column must be identical between source corps and their corresponding euro corps when these reports are run. The reporting date should be the last day of the year Determine whether the euro amounts were converted correctly (Box 1260). Using audit trail reports, determine (Box 1261) which steps were not completed correctly, restore back to that point and reconvert (Box 1265).

In test, update euro corp F1 period 00 by running master file maintenance (Box 1270) with a V1M1S transaction to populate period 00 of the future year with beginning balance sheet balances for each corp and create a report (Box 1272).

Figure 9E:
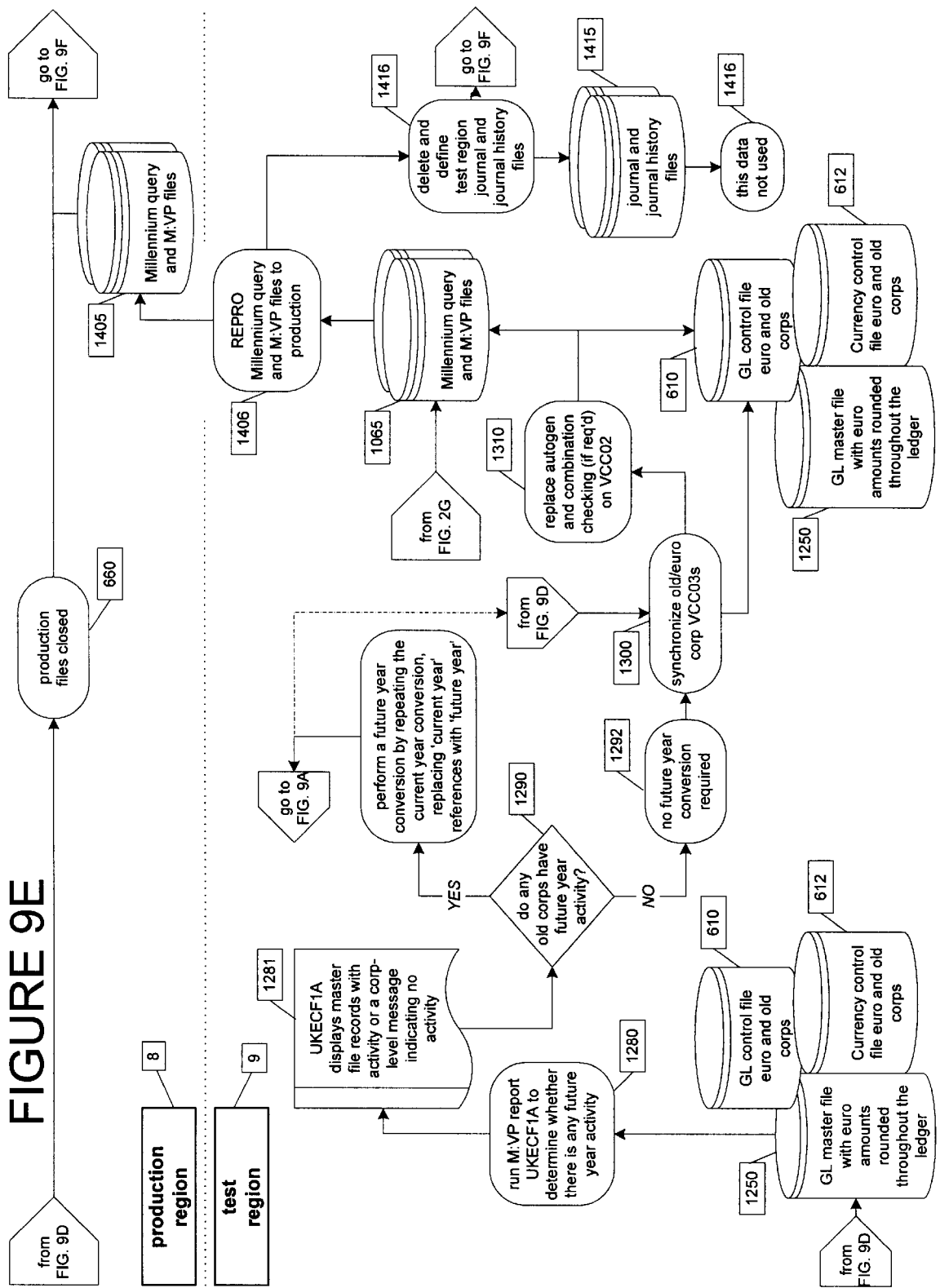

Referring to FIG. 9E, determine whether there are future year amounts to convert by running M:VP cycle EUROF1A to make this determination (Box 1280). This report simply displays the key, amount class, and period number for which any future year (F1 or F1A) balances exist (Box 1281). Only keys with activity appear on the report. If there is no activity for a corp, a message stating so is displayed.

All VCC03 reporting columns must remain in period 12 of the current year while running this report. However, if future year activity is found for any corps, change the reporting column on the VCC03 for each of them now to period 12 of the future year.

If any corps show activity, they must be converted. The process (Box 1290) is essentially the same as the current year process, repeating current year tasks in exactly the same sequence for F1 as was done for CY.

If no future year conversion is required (Box 1292), then in the test region, manually synchronize euro corp VCC03 (Box 1300) data with those from old corps as they appear in production. Some of these data may have changed during the conversion process. To be safe, manually compare all VCC03 fields (including LAST PERIOD RELEASED) on each euro corp to ensure that each is identical to the same field on the corresponding old corp's VCC03.

Still referring to FIG. 9E in the test region, turn on Autogen and combo checking (Box 1310) for each euro corp on its VCC02 (Autogen corps only). The Autogen and combo checking switches were turned off when the euro corps were built during pre-cutover preparation. Turning off Autogen allowed the euro corp master file records to be built with identical field values to their corresponding old corps, without regard to changes that Autogen would have made to various fields.

Replace each corp's switches now with the values from the old corps. Screenpics of each corp were taken during pre-cutover preparation. When these switches have been re-set, each euro corp will have the same relationship to the VCV as its corresponding old corp had prior to the start of the conversion process. Back up the test region, all application and Millennium files.

Back up production, all application and Millennium files (Box 1065).

Repro Millennium Query and M:VP files to production (Box 1400). Back up all production Millennium and M:VP files (Box 1405).

Still referring to FIG. 9E, in the test region, delete and define the G30019 and G30041 files (Box 1410). No journal records or journal history records whatsoever should migrate to production for the euro corps (Box 1415). Deleting and defining the G30019 and G30041 files now will ensure this result while maximizing efficiency on the upcoming DNR. Later, these test region files will be repopulated with copies of current production files.

Figure 9F:
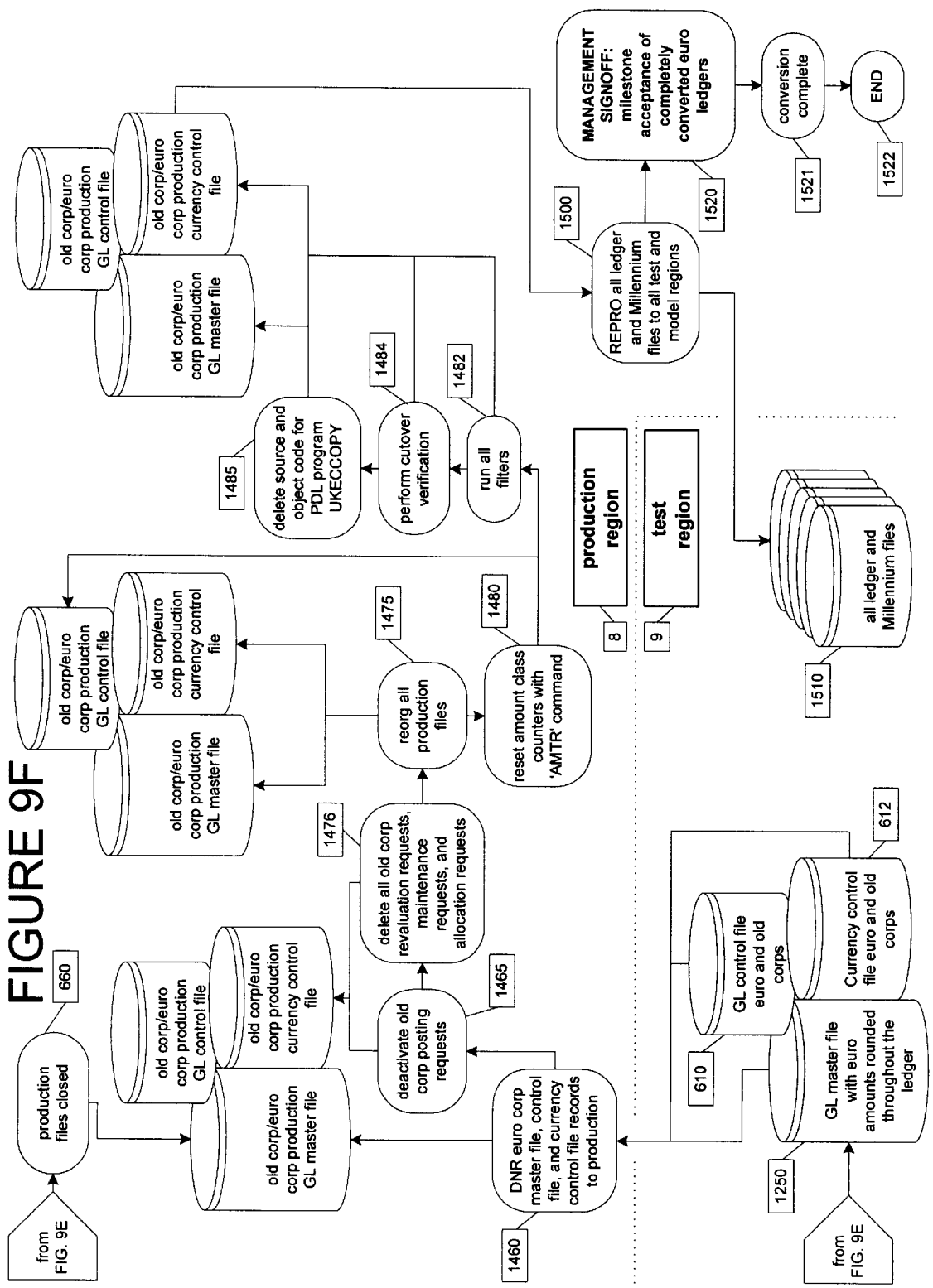

Referring to FIG. 9F DNR corp control and master file records from test to production (Box 1460). DO NOT use IDCAMS REPRO to move the physical files—the euro corps would move correctly, but we would lose the old corps. (Note the structure of the startkeys, which isolates the euro corp for the DNR.) Do not use IDCAMS REPRO to move the physical files—the euro corps would move correctly, but we would lose the old corps. (Note the structure of the startkeys, which isolates the euro corp for the DNR.) Back up production GL files. Use the standard production GL backup routine.

In production, deactivate all VCRs (posting requests) (Box 1465) for old corps. On the VCRLS, change the ACTIVATE switch to '0' (zero). If additional reporting is required at some point, one or more of these request cards can be reactivated.

In production, delete all old corps' revaluation requests (Box 1470). On VRV01, delete all records for old corps. Revaluation must not run again against the old corps.

In production, evaluate and possibly delete all old corps' user-DBID records. Evaluate whether records pertaining to the old corps on your custom databases are required any longer for production processing. Delete those that are no longer required.

In production, delete all old corps' maintenance requests. On V1B01, delete all records for old corps. No further maintenance can be performed against the old corps.

In production, delete all old corps' allocation requests. On VAR01, delete all requests for old corps. No further allocations can be performed against the old corps.

In production, delete additional control file records for old corps. The maintenance that has already been performed to the old corps makes it extremely difficult to inadvertently update the corp's master file. To further protect the old corps, increase efficiency, and avoid confusion as ongoing maintenance to euro corps is performed, the old corps' records on a certain set of databases should be deleted. (Some of these DBIDs are optional, and may or may not hold records for the old corps at the time you perform these deletes.)

Still referring to FIG. 9F, request a reorg of your GL files (Box 1475). This will optimize processing efficiency.

In production, perform 'AMTR' subcommand on VSC01 (Box 1480). This subcommand, normally used during year-open processing, ensures that the system-level amount class counters include the new production euro corps as well as the old corps, which continue to reside in production. Back up production GL files. Use the standard production GL backup routine.

Run all GL filters (Box 1482). Rather than using standard jobsteams, use the 'create' mode for this run of filters against all queryable physical files, except history, which has not changed.

Perform cutover acceptance testing to current verification standards (Box 1484). In all regions, delete PDL program EUROCOPY (Box 1485) from production Millennium files (if present). The nature of this program introduces risk to the production master file that is unnecessary. It has outlived its usefulness and must be deleted. M:VP reports and other tools do not present the same risk and can optionally be kept or deleted. To delete the EUROCOPY program source code, use the command line;

Re-create test and model regions as soon as possible, by performing an IDCAMS REPRO (Box 1500) of all application files and Millennium files to all your test or model regions so that they mimic the new GL:M production configuration. These REPROS must be coordinated with other users to ensure that testing data or development work in progress is not lost. These rebuilt regions then resume their normal roles as your support and development regions.

Obtain signoff on user's acceptance (Box 1520) of the converted euro ledgers before the production VSAM files are reopened for user access.

Detail of M:VP Report 'EUROAMTS'

Set EUROAMTS CO7BR request to include all prior year EUROAMTS report sequences (Box 861). Run M:VP in batch using without an output file for master file maintenance transactions (U1M) (Box 862). Process the next corp (Box 863). Read VCC to determine this corp's book one currency, find the euro rate for that participating currency, calculate the euro corp name and load into memory (Box 864). Read the next master file record, load the key and currency code into memory (Box 865). Determine whether this is a non-participating transaction currency record (Box 866). Using old corp amounts "as is", write a maintenance transaction using the euro corp with old corp's master file key and currency code (Box 867).

Determine whether this record is a non-participating book one equivalent or a book one record (Box 870). Using old corp amounts divided by the "book one rate", write a maintenance transaction using the euro corp with old corp master file key and currency code (Box 871).

Determine whether this is a participating transaction currency or participating book one equivalent record (Box 875). Using old crop amounts divided by the "book one rate", adjust the amounts in the euro-as-transaction currency accumulator (Box 876). This will create a temporary accumulator for converted euro-as-transaction amounts (Box 877).

Determine whether there were any participating transaction book one equivalents within this master file key (Box 882). Using the accumulated euro-as-transaction currency amounts, write maintenance transaction using the euro corp with old corp master file key and EUX? as the currency code (Box 884). This, along with other steps, create the master file maintenance transactions (Box 885).

Determine whether this was the last record within the master file key (Box 878). Determine whether this was the master file key within this corp (Box 879). Determine whether this was the final converting corp (Box 880).

Detail of M:VP Report EURO2RND

Referring to FIG. 7, set EURO2RND CO7BR request to include all prior year EURO2RND report sequences (Box 425). Ensure EURO2RND extract reads only book one equivalent and book one records in old corps (Box 427). Run M:VP in batch without an output file for master file maintenance transactions (U1M) (Box 427).

Process the next corp (Box 428). Read VCC to determine this corp's book one currency, find the euro rate for that participating currency, calculate the euro name and load into memory (Box 429). Read the next master file record, load the key and currency code into memory (Box 430).

Determine whether this a participating book one equivalent (Box 431). If it is not, determine whether the account type is a balance sheet or a profits and loss (Box 432). If this a balance sheet calculate the sum of period 00 through each accounting and adjustment period, divide by the book one rate and load into memory (Box 433). If this is a P & L sheet calculate the sum of period 01 through each accounting and adjustment period, divide by the book one rate and load into memory (Box 433). Read the corresponding euro record using the old corp's master file key and currency code (Box 435). Calculate the YTD balance for each period in the euro corp through each accounting and adjustment period and load into memory (Box 436). Calculate the difference between each accounting period's old corp YTD balance converted to euros and the corresponding euro corp YTD balance and load into memory (Bos 437). Using the 2D rounding entry for each accounting period, the euro corp name, and master file key and currency code from memory, write a master file maintenance transaction (Box 438). This will create a master file of maintenance transactions (Box 455).

Determine whether this was the last record within this master file key (Box 445). Determine whether there were any participating currency book one equivalents within this master file key (Box 446). Read the corresponding euro record using the old corp's master file key and EUX1 as the currency code (Box 447). Calculate the YTD balance for each period in the euro corp through each accounting and adjustment period and load into memory (Box 448). Calculate the difference between each accounting period's old corp accumulated participating currency YTD balance and the corresponding euro corp YTD balance and load into memory (Box 449). Using the 2D rounding entry for each accounting period, the euro corp name, the master file key from memory, and EUX1 as the currency code, write a master file maintenance transaction (Box 450)

If this is not a participating currency, determine whether the account type is a balance sheet or a profits and loss (Box 440). If this a balance sheet calculate the sum of period 01 through each accounting and adjustment period, divide by the book one rate and load into memory (Box 441). If this is a P & L sheet calculate the sum of period 01 through each accounting and adjustment period, divide by the book one rate and load into memory (Box 442).

This creates a temporary accumulator for participating currency YTD balances (Box 443)

Determine whether this was the last master file key within this corp (Box 451).

Determine whether this is the final converting corp (Box 452).

Detail of M:VP Report EURO3RND

Referring to FIG. 8, set EURO3RND CO7BR request to include all prior year EURO3RND report sequences (Box 950). Ensure EURO3RND extract reads only book one equivalent and book one records in old corps (Box 951). Run M:VP in batch without output file for master file maintenance transactions (U1M) (Box 952).

Process the next corp (Box 953). Determine whether this is a euro book one corp (Box 954). Read VCC to determine this corp's book one currency, find the euro rate for that participating currency, calculate the euro name and load into memory (Box 956). Read the next master file record, load the key and currency code into memory (Box 430).

Read the next corp (Box 957). Determine whether the account type is a balance sheet or a profits and loss (Box 958). If this a balance sheet calculate the sum of period 00 through each accounting and adjustment period, and load into memory (Box 960). Divide each accounting and adjustment period YTD amount by the book one rate and load into memory (Box 962).

Determine whether this balance sheet is type A of L (Box 964). If it is type 'A', add the participating currency detail amounts to the participating currency assets (Box 968). Add euro detail amount to 'euro detail assets' (Box 970).

If it is type 'L', add the participating currency detail amounts to the participating currency liabilities (Box 966). Add euro detail amount to 'euro detail liabilities' (Box 972).

If this is a P & L sheet calculate the sum of period 01 through each accounting and adjustment period and load into memory (Box 959). Divide each accounting and adjustment period YTD amount by the book one rate and load into memory (Box 962).

Determine whether this account is type I or type E (Box 963). If it is type 'I', add the participating currency detail amounts to the participating currency revenue (Box 967). Add the euro detail amount to 'euro detail revenue' (Box 969).

If it is type 'E', add the participating currency detail amounts to the participating currency expenses (Box 965). Add the euro detail amount 'euro detail expenses' (Box 971).

Determine whether this was the last book one record in this corp (Box 980). Add participating currency assets and participating currency liabilities to get participating net balance sheet (Box 981). Add participating currency revenue and participating currency expenses to get participating net income statement (Box 982). Add participating currency assets, participating currency liabilities, participating currency revenue and participating currency expenses to get participating currency net corp balance (Box 983).

Add euro assets and euro liabilities to get euro net balance sheet (Box 984). Add euro revenue and euro expenses to get euro net balance sheet (Box 985). Add euro assets, euro liabilities euro revenue and euro expenses to get euro net corp balance sheet (Box 986).

If this is a euro book one corp, determine whether this records is balance sheet or an income statement (Box 990). If this records is a balance sheet, calculate the sum of period 00 through each accounting and adjustment period ('euro m/f amount') and load into memory (Box 991). If this record is an income statement, calculate the sum of period 01 through each accounting and adjustment period ('euro m/f amount') and load into memory (Box 992).

Determine whether this record is an asset, liability, income or expense record (Box 993).

If an asset, add euro master file amount to 'euro master file assets' (Box 994). If a liability, add euro master file amount to 'euro master file liability' (Box 995). If an income, add euro master file amount to 'euro master file income' (Box 996). If an expense, add euro master file amount to 'euro master file expense' (Box 997).

Determine whether this was the last book one record in this corp (Box 998). Add euro master file assets and the euro master file liabilities to get euro master file net balance sheet (Box 999A). Add euro master file revenue and euro master file expenses to get euro master file net income statement (Box 999B). Determine whether this was the final corp (Box 955).

Add euro master file assets, euro master file liabilities, euro master file revenue and euro master file expenses to get euro net corp balance (Box 999C)

Detail of EUROCOPY Program

Figure 5A:
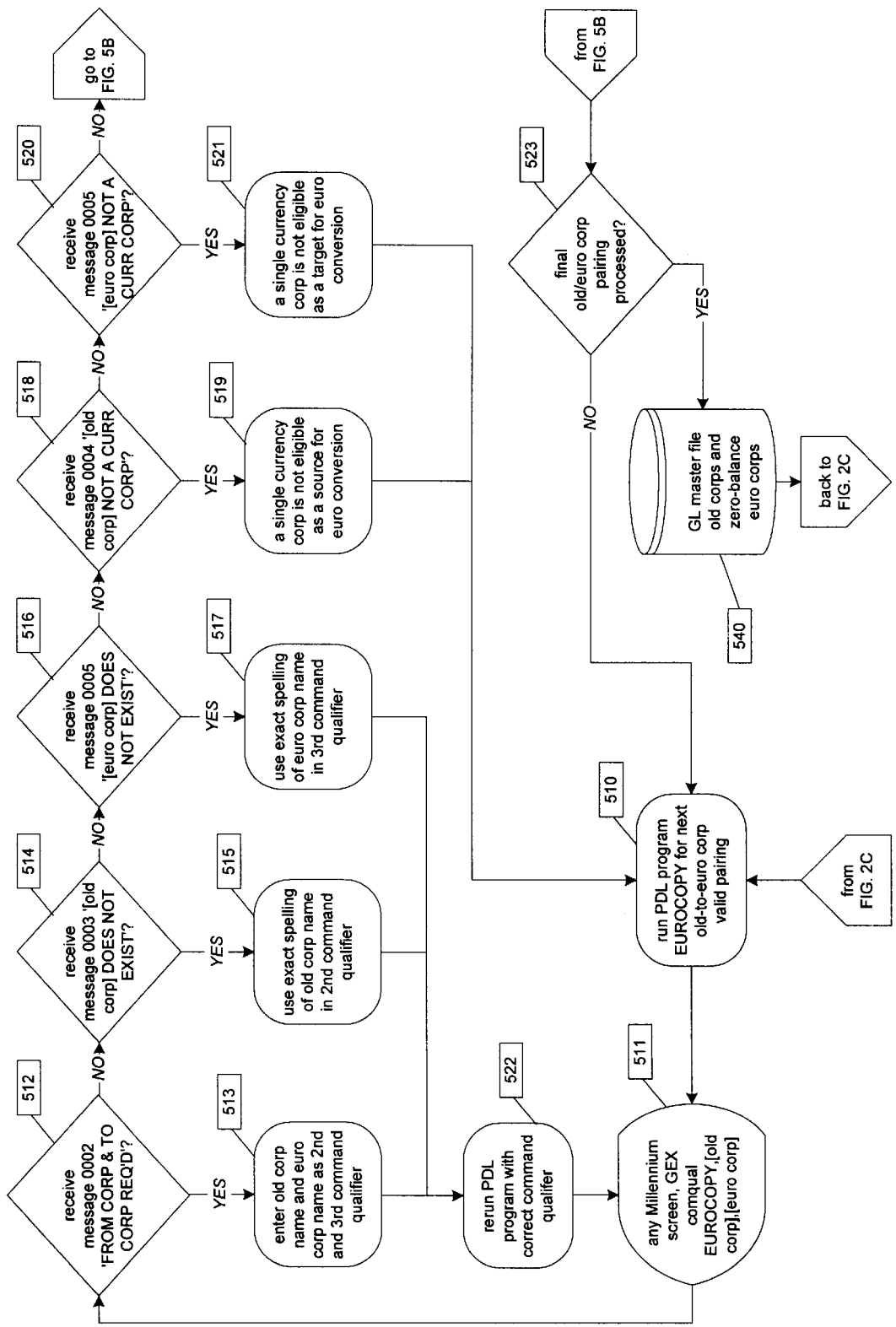
FIGS. 5A–5B are flowcharts showing the PDL program EUROCOPY of FIG. 2C in greater detail.
Figure 5B:
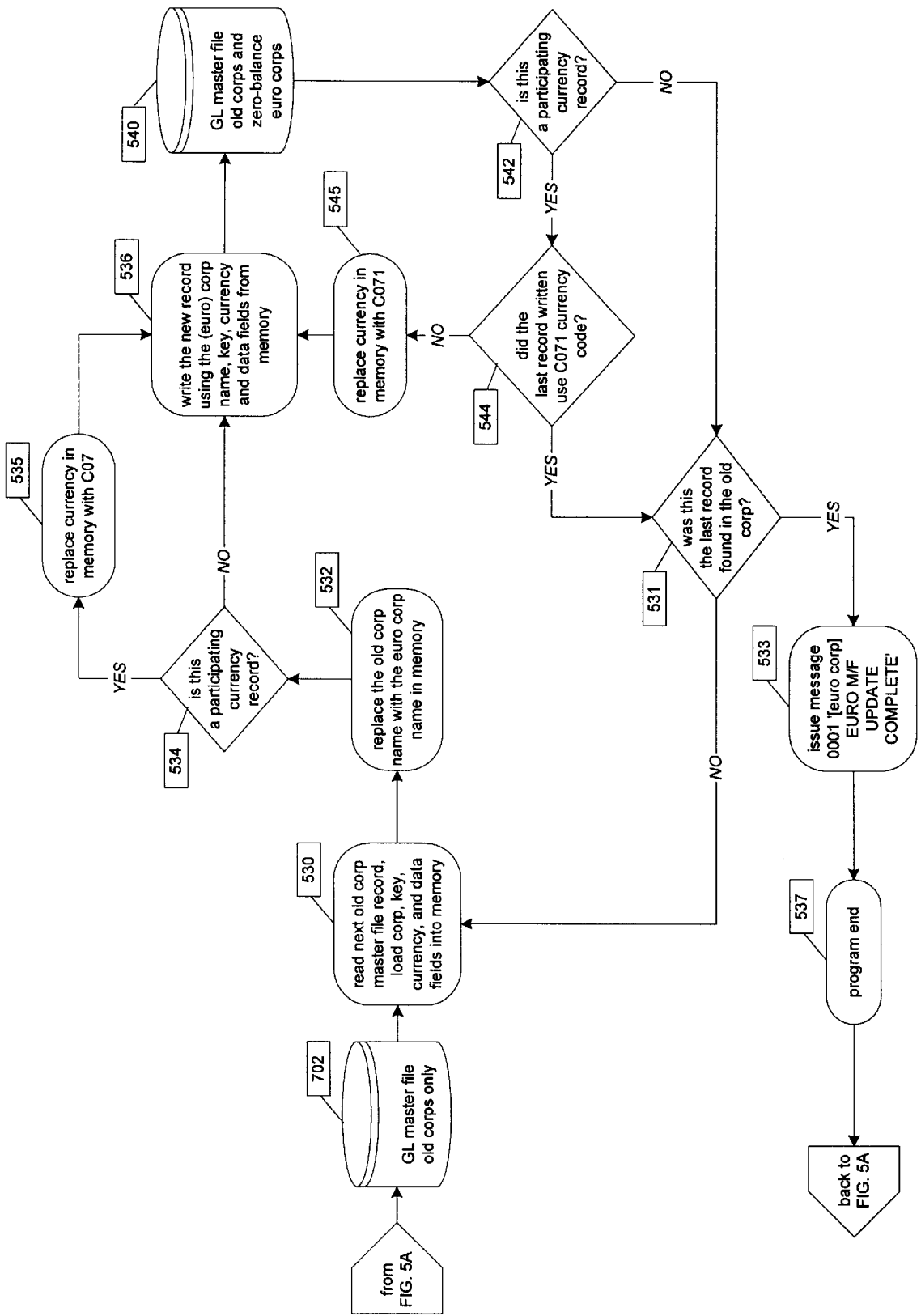

Referring to FIG. 5A, a Procedure Definition Language program EUROCOPY is sun for the next old-to-euro corp valid pairing (Box 510). For any Millennium screen, GEX EUROCOPY, (old corp), (euro corp) (Box 511).

Determine whether a message was received stating "FROM CORP & TO CORP REQ'D" (Box 512). Enter old name and euro corp name as $2^{nd}$ and $3^{rd}$ command identifier (Box 513.

Determine whether a message was received stating "[old corp] DOES NOT EXIST" (Box 514). Use exact spelling of old corp name in $2^{nd}$ command qualifier (Box 515).

Determine whether a message was received stating "[euro corp] DOES NOT EXIST" (Box 516). Use exact spelling of old corp name in $3^{rd}$ command qualifier (Box 517).

Rerun PDL program with correct command qualifier (Box 522).

Determine whether a message was received stating "[old corp] NOT A CURR CORP" (Box 518). A single currency corp is not eligible as a source for euro conversion (Box 519).

Determine whether a message was received stating "[euro corp] NOT A CURR CORP" (Box 520). A single currency corp is not eligible as a target for euro conversion (Box 521).

Read the next old corp master file record, load corp, key, currency and date fields into memory (Box 530). Replace the old corp name with the euro corp name in memory (Box 532).

Determine whether this is a participating currency record (Box 532). Replace currency in memory with EUX (Box 535). Write the new record using the euro corp name, key, currency and date fields from memory (Box 536) creating GL master file old corps and zero-balance euro corps (Box 540).

Determine whether this is a participating currency record (Box 542). Determine whether the last record written use EUX1 currency code (Box 544). Replace currency in memory with EUX1 (Box 545).

Determine whether this was the last record found in the old corp (Box 531). Issue a message stating 0001 [euro corp] EURO M/F UPDATE COMPLETE (Box 533). The program is ended (Box 537).

Having set forth the general nature and the specific embodiments of the present invention, the true scope is now particularly pointed out in the appended claims.

I claim:

1. A method for use with a computer for converting an ongoing old corp production ledger processing with a participating currency, to an ongoing production ledger processing with a target currency, said old corp production ledger comprising an old master file including a plurality of old master file records, each old master file record comprising a key identifying the record, data fields and amount fields, said method comprising the steps of:

a. selecting a target currency, b. selecting a particular time period, c. providing a target currency master file that is substantially identical to the old currency master file, by creating a target currency corp record corresponding to each old currency master file corp record within the old currency master file except that the target currency corp records within the target master file hold zero balances and all participating transaction currency records and their book one equivalents within one old master file key are replaced by a single target transaction record and its book one equivalent, d. converting the amounts of all transaction currency records and their book one equivalents for the selected time period into their corresponding target currency equivalent amounts, e. rounding said target currency equivalent amounts, wherein the step of rounding the target currency equivalent amounts comprises the steps of:

i. creating second dimensional rounding entries for year-to-date balances through each accounting period within each target currency transaction currency records and book one equivalents within said target master file, and ii. creating a master file maintenance audit trail report, and f. populating the target currency corp records within the target master file with the corresponding rounded target currency equivalent amounts.

2. The method according to claim 1, wherein the particular time period selected is the prior year.

3. The method according to claim 1, wherein the particular time period selected is the current year.

4. The method according to claim 1, wherein the particular time period selected is a future year.

5. The method according to claim 1, wherein the step of creating second dimensional rounding entries comprises the steps of:

a. providing transaction currency records and its book one equivalent in old currency corps;

b. determining said old currency corp's currency code, c. determining a target currency conversion rate corresponding to said old currency corp's currency, d. determining said old currency corp's corresponding converted target currency corp equivalent, e. determining the next master file record, its corresponding master file key and its corresponding currency code, f. storing said next master file key and its corresponding currency code, and g. determining whether said converted target currency corp equivalent is a participating currency corp book one equivalent.

6. The method according to claim 5, further comprising the steps of:

a. determining the sum of period 01 through each accounting and adjustment period, b. determining the difference between each accounting period's old currency corp accumulated participating year-to-date balance and the corresponding target currency corp year-to-date balance, c. creating a first master file maintenance transaction, and d. populating said first master file maintenance transaction for each accounting period with a target currency corp name, its corresponding master file key and the target currency as the currency code.

7. The method according to claim 5, further comprising the steps of:

a. determining the sum of period 01 through each accounting and adjustment period, b. comparing the target currency corp records with its corresponding old currency corp master file key and its corresponding currency code, c. determining the year-to-date balances for each period in the target currency corp through each accounting and adjustment period, d. determining the difference between each accounting period's old currency corp year-to-date balance converted to the target currency and the corresponding target currency corp year-to-date balance, e. creating a second master file maintenance transaction, f. populating said second master file maintenance transaction for each accounting period with a target currency corp name, its corresponding master file key and its corresponding currency code, and g. determining whether more records exists in the current master file key.

8. The method according to claim 6 or 7, further comprising the step of determining whether any participating currency book one equivalents exist within the current master file key.

9. The method according to claim 8, further comprising the step of determining whether more master file keys exist within the current corp record.

10. The method according to claim 8, further comprising the step of a. providing the corresponding target currency records, b. applying the old currency corp's master file key, c. using the target currency book one equivalent as the currency code, and determining the year-to-date balance for each period in the target currency corp through each accounting and adjustment period.

11. The method according to claim 9, further comprising the step of determining the existence of any corp records not converted into the target currency.

12. The method according to claim 1, wherein the step of rounding the target currency equivalents comprises the steps of:

a. creating third dimensional rounding entries for year-to-date balances through each accounting period within each target currency transaction currency records and its book one equivalent corp records within said target master file, and b. providing transaction currency records and their book one equivalents in old currency corps.

13. The method according to claim 12, further comprising the step of distinguishing between euro book one currency corps and old book one currency corps.

14. The method according to claim 13, further comprising the steps of:

a. determining said old book one currency corp's currency code, b. determining a target currency conversion rate corresponding to said old currency corp's currency, c. determining said old currency corp's corresponding converted target currency corp equivalent, and d. storing said next master file key and its corresponding currency code.

15. The method according to claim 14, further comprising the step of:

determining the next book one record.

16. The method according to claim 13 or 15, further comprising the step of:

a. distinguishing between balance sheet records and income statement records, b. distinguishing between an asset type record and a liability type record, c. distinguishing between an income type record and an expense type record, d. calculating the sum of balance sheet records for period 00 through each accounting and adjustment period, e. loading the sum of balance sheet records for period 00 through each accounting and adjustment period into the memory of the computer, f. calculating the quotient of balance sheet records for each accounting and adjustment period YTD divided by the amount of the book one rate, g. loading said quotient into the memory of the computer, h. calculating the sum of incomes statement records for period 01 through each accounting and adjustment period, i. loading said sum of income statement records into the memory of the computer, and j. calculating the quotient of the income statement records for each accounting and adjustment period YTD divided by the amount of the book one rate.

17. The method according to claim 16, further comprising the step of determining whether more book one records exist in said old corp.

18. The method according to claim 17, further comprising the steps of:

a. determining a participating net balance sheet, participating net income and a participating currency net corp balance, b. determining a euro net balance sheet, a euro net income statement and a euro net corp balance sheet, and c. determining euro master file net balance sheet, a euro master file net income statement, and a euro net corp balance.

19. The method according to claim 1 wherein said old currency master-file corp records include participating and non-participating currency records.

20. The method according to claim 19, wherein the step of rounding the euro equivalent amounts further comprises the steps of:

a. creating third dimensional rounding entries for year-to-date balances through each accounting period within each euro currency transaction currency record and its book one equivalent corp records within said euro master file, and b. providing transaction currency records and their book one equivalents in old currency corps.

21. A method for use on a general purpose computer for converting an ongoing old corp production ledger processing in a participating currency to an ongoing production ledger processing in euros, said old corp production ledger comprising an old master file including a plurality of old master file records, each old master file record comprising a key identifying the record, data fields and amount fields, said method comprising the steps of:

a. selecting a particular time period, b. creating a euro master file that is substantially identical to the old currency master file, by creating a euro master file containing at least one euro corp record corresponding to each old currency master file corp record within the old currency master file except that the euro corp records within the euro master file hold zero balances and all participating transaction currency records and their book one equivalents within one old master file key are replaced by a single target transaction currency record and its book one equivalent, c. converting the amounts of all transaction currency records and their book one equivalents for the selected time period into their corresponding euro equivalent amounts, d. rounding said euro equivalent amounts, wherein the step of rounding the euro equivalent amounts comprises the steps of:

i. creating second dimensional rounding entries for year-to-date balances through each accounting period within each target currency transaction currency records and book one equivalents within said euro master file, and ii. creating a euro master file maintenance audit trail report, and e. populating the euro master file corp records within the euro master file with the corresponding rounded euro currency equivalent amounts.

22. A general purpose computer programmed for automatically correcting intra record accumulation of rounding errors occurring during the conversion of a booking ledger from a participating currency to a target currency, the general purpose computer comprising:

a. means for creating second dimensional rounding entries for year-to-date balances through each accounting period within each target currency transaction currency records and its book one equivalent within a target master file, b. means for creating a master file maintenance audit trail report, c. means for providing transaction currency records and their book one equivalents in old currency corps;

d. means for determining said old currency corp's currency code, e. means for determining a target currency conversion rate corresponding to said old currency corp's currency, f. means for determining said old currency corp's corresponding converted target currency corp equivalent, g. means for determining the next master file record, its corresponding master file key and its corresponding currency code, h. means for storing said next master file key and its corresponding currency code, i. means for determining whether said converted target currency corp equivalent is a participating currency corp book one equivalent, j. a first means for determining the sum of period 01 through each accounting and adjustment period, k. means for determining the difference between each accounting period's old currency corp accumulated participating year-to-date balance and the corresponding target currency corp year-to-date balance, l. means for creating a first master file maintenance transaction, m. means for populating said first master file maintenance transaction for each accounting period with a target currency corp name, its corresponding master file key and the target currency as the currency code, n. means for comparing the target currency corp records with its corresponding old currency corp master file key and its corresponding currency code, o. means for determining the year-to-date balances for each period in the target currency corp through each accounting and adjustment period, p. means for determining the difference between each accounting period's old currency corp year-to-date balance converted to the target currency and the corresponding target currency corp year-to-date balance, q. means for creating a second master file maintenance transaction, r. means for populating said second master file maintenance transaction for each accounting period with a target currency corp name, its corresponding master file key and its corresponding currency code, s. means for determining whether more records exists in the current master file key, t. means for determining whether any participating currency book one equivalents exist within the current master file key, u. means for determining whether more master file keys exist within the current corp record, v. means for providing the corresponding target currency records, w. means for applying the old currency corp's master file key, x. means for using the target currency book one equivalent as the currency code, y. means for determining the year-to-date balance for each period in the target currency corp through each accounting and adjustment period, and z. means for determining the existence of any corp records not converted into the target currency.

23. A general purpose computer programmed for automatically correcting intra ledger accumulation of rounding errors occurring during the conversion of a booking ledger from a participating currency to a target currency, the general purpose computer comprising:

a. means for creating third dimensional rounding entries for year-to-date balances through each accounting period within each target currency transaction currency record and its book one equivalent within a target master file, b. means for providing transaction currency records and their book one equivalents in old currency corps, c. means for distinguishing between euro book one currency corp's and old book one currency corps, d. means for determining said old book one currency corps currency code, e. means for determining a target currency conversion rate corresponding to said old currency corp's currency, f. means for determining said old currency corp's corresponding converted target currency corp equivalent, g. means for storing said next master file key and its corresponding currency code, h. means for determining the next book one record, i. means for distinguishing between balance sheet records and income statement records, j. means for distinguishing between an asset type record and a liability type record, k. means for distinguishing between an income type record and an expense type record, l. means for calculating the sum of balance sheet records for period 00 through each accounting and adjustment period, m. means for loading the sum of balance sheet records for period 00 through each accounting and adjustment period into the memory of the computer, n. means for calculating the quotient of balance sheet records for each accounting and adjustment period YTD divided by the amount of the book one rate, o. means for loading said quotient into the memory of the computer, p. means for calculating the sum of incomes statement records for period 01 through each accounting and adjustment period, q. means for loading said sum of income statement records into the memory of the computer, r. means for calculating the quotient of the income statement records for each accounting and adjustment period YTD divided by the amount of the book one rate, s. means for determining whether more book one records exist in said old corp, t. means for determining a participating net balance sheet, participating net income and a participating currency net corp balance, and u. means for determining a euro net balance sheet, a euro net income statement and a euro net corp balance sheet, v. means for determining euro master file net balance sheet, a euro master file net income statement, and a euro net corp balance.

24. The computer according to claim 22 or 23, wherein the target is the euro.

25. A method for use with a computer for converting an ongoing old corp production ledger processing with a participating currency, to an ongoing production ledger processing with a target currency, said old corp production ledger comprising an old master file including a plurality of old master file records, each old master file record comprising a key identifying the record, data fields and amount fields, said method comprising the steps of:

a. selecting a target currency, b. selecting a particular time period, c. providing a target currency master file that is substantially identical to the old currency master file, d. creating a target currency corp record corresponding to each old currency master file corp record within the old currency master file, e. populating the target currency corp records within the target master file with zero balances, f. replacing all participating transaction currency records and their book one equivalents within one old master file key with a single target transaction record and its book one equivalent, g. converting the amounts of all transaction currency records and their book one equivalents for the selected time period into their corresponding target currency equivalent amounts, h. rounding said target currency equivalent amounts wherein the step of rounding the target currency equivalent amounts comprises the steps of:
  i. creating second dimensional rounding entries for year-to-date balances through each accounting period within each target currency transaction currency records and book one equivalents within said target master file, and
  ii. creating a master file maintenance audit trail report, and i. populating the target currency corp records within the target master file with the corresponding rounded target currency equivalent amounts.

26. The method according to claim 25, wherein the step of rounding the target currency equivalents further comprises the steps of:

a. creating third dimensional rounding entries for year-to-date balances through each accounting period within each target currency transaction currency records and its book one equivalent corp records within said target master file, and b. providing transaction currency records and their book one equivalents in old currency corps.

* * * * *